United States Patent
Higashiyama

(10) Patent No.: US 9,661,454 B2
(45) Date of Patent: May 23, 2017

(54) COMMUNICATION APPARATUS THAT COMMUNICATES WITH INFORMATION PROCESSING APPARATUS, METHOD OF CONTROLLING COMMUNICATION APPARATUS, AND STORAGE MEDIUM

(71) Applicant: CANON KABUSHIKI KAISHA, Tokyo (JP)

(72) Inventor: Teruyuki Higashiyama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 268 days.

(21) Appl. No.: 14/461,005

(22) Filed: Aug. 15, 2014

(65) Prior Publication Data
US 2015/0049673 A1    Feb. 19, 2015

(30) Foreign Application Priority Data
Aug. 19, 2013   (JP) ................ 2013-169797

(51) Int. Cl.
| | | |
|---|---|---|
| H04N 21/4223 | (2011.01) | |
| H04W 4/02 | (2009.01) | |
| H04L 29/08 | (2006.01) | |
| H04W 48/16 | (2009.01) | |
| H04W 12/06 | (2009.01) | |

(52) U.S. Cl.
CPC .............. H04W 4/02 (2013.01); H04L 67/16 (2013.01); H04W 12/06 (2013.01); H04W 48/16 (2013.01)

(58) Field of Classification Search
CPC ....... H04W 4/02; H04W 12/06; H04W 48/16; H04L 67/26
See application file for complete search history.

(56) References Cited

U.S. PATENT DOCUMENTS

2005/0193245 A1* 9/2005 Hayden ............... G06F 11/2069
                                                            714/13
2008/0140822 A1* 6/2008 Torii .................. H04L 41/0213
                                                            709/223

(Continued)

FOREIGN PATENT DOCUMENTS

| JP | 2007-249821 A | 9/2007 |
|---|---|---|
| JP | 2011-118859 A | 6/2011 |

*Primary Examiner* — Fan Ng
(74) *Attorney, Agent, or Firm* — Rossi, Kimms & McDowell LLP

(57) ABSTRACT

A communication apparatus communication apparatus capable of performing communication by quickly determining a suitable communication path from among a plurality of communication paths. A digital camera searches for a predetermined device connected to the same network, and transmits content data to the predetermined device found by the search. The digital camera is controlled according to one of a plurality of modes including a first control mode in which when a first time period elapses without the predetermined device being found, after starting the search, the search is stopped, and a second control mode in which, when a second time period elapses without the predetermined device being found, after starting the search, the search is stopped, and the content data is transmitted to a cloud server. The second time period is shorter than the first time period.

16 Claims, 17 Drawing Sheets

(56) References Cited

U.S. PATENT DOCUMENTS

| | | | | |
|---|---|---|---|---|
| 2009/0203330 A1* | 8/2009 | Arimoto | H04M 1/72505 | 455/90.2 |
| 2009/0256672 A1* | 10/2009 | Yamamoto | G06Q 10/08 | 340/5.2 |
| 2009/0268076 A1* | 10/2009 | Kawamura | H04N 1/00408 | 348/333.12 |
| 2011/0047266 A1* | 2/2011 | Yu | H04L 67/2814 | 709/224 |
| 2011/0081923 A1* | 4/2011 | Forutanpour | G06F 1/1694 | 455/457 |
| 2011/0222516 A1* | 9/2011 | Kurose | H04M 1/7253 | 370/338 |
| 2012/0242845 A1* | 9/2012 | Tan | H04N 1/00413 | 348/207.1 |
| 2013/0198283 A1* | 8/2013 | Kang | H04L 43/10 | 709/204 |
| 2013/0212124 A1* | 8/2013 | Fukada | G06F 17/30477 | 707/769 |
| 2013/0238240 A1* | 9/2013 | Tamai | G01C 21/3446 | 701/527 |
| 2014/0241210 A1* | 8/2014 | Tokunaga | H04W 8/005 | 370/254 |

* cited by examiner

| No. | CAMERA IDENTIFIER | PC IDENTIFIER |
|---|---|---|
| 1 | 123456 | 3456789 |

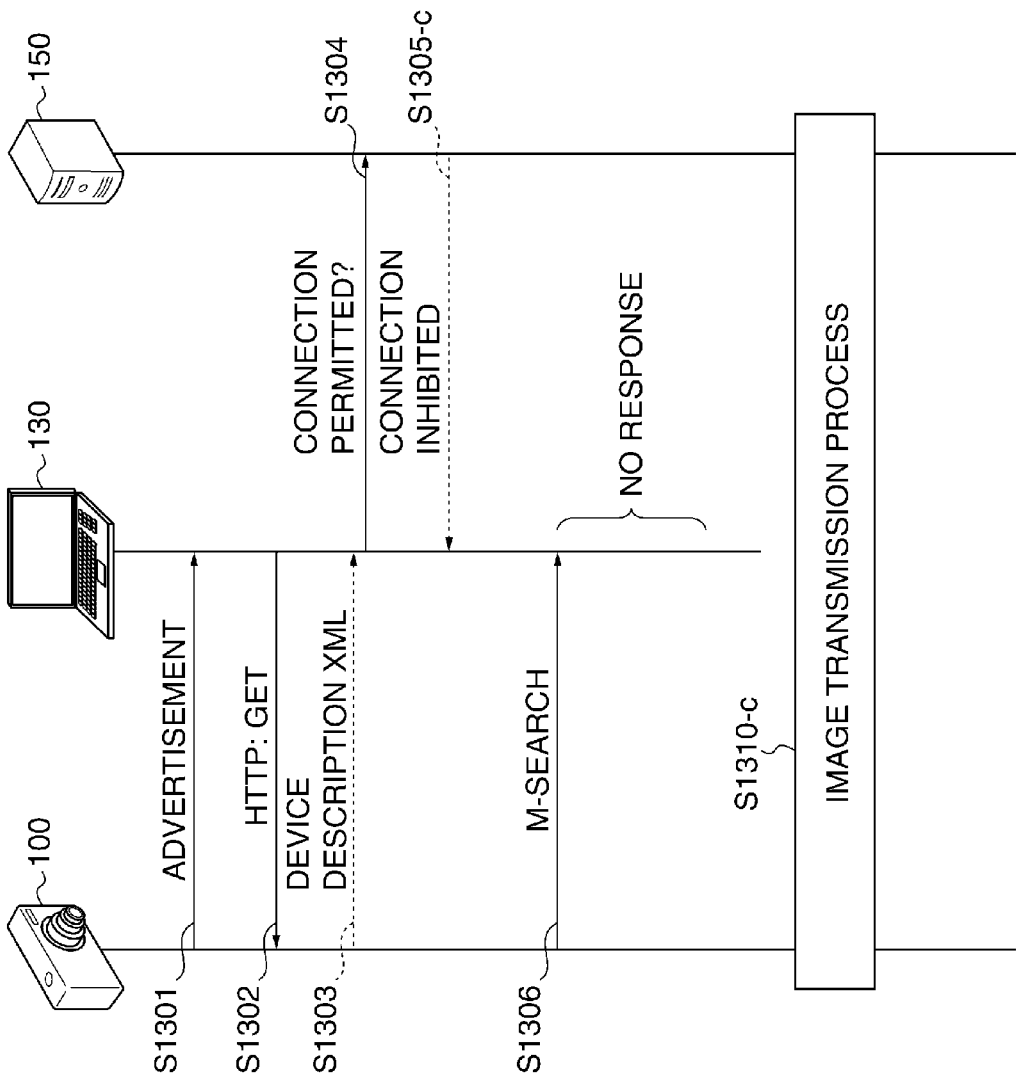

COMMUNICATION APPARATUS THAT COMMUNICATES WITH INFORMATION PROCESSING APPARATUS, METHOD OF CONTROLLING COMMUNICATION APPARATUS, AND STORAGE MEDIUM

BACKGROUND OF THE INVENTION

Field of the Invention

The present invention relates to a communication apparatus that communicates with an information processing apparatus, a method of controlling a communication apparatus, and a storage medium, and more particularly to a communication apparatus that transmits content to other apparatuses via a network.

Description of the Related Art

To transmit and receive digital content, such as image data and moving image data, stored in a digital camera equipped with a wireless communication function, to and from other apparatuses having the same function, there has been proposed an image sharing system for exchanging or sharing the image data and the like over the same network (see e.g. Japanese Patent Laid-Open Publication No. 2011-118859).

Further, there has been known a system in which a plurality of devices share content via a server on the Internet (see e.g. Japanese Patent Laid-Open Publication No. 2007-249821).

In general, such communication performed in the same network as disclosed in Japanese Patent Laid-Open Publication No. 2011-118859 is higher in communication speed than such communication performed over the Internet as disclosed in Japanese Patent Laid-Open Publication No. 2007-249821. Therefore, when transmitting data from a communication apparatus equipped with both of communication functions for performing communication in the same network and performing communication over the Internet to a specific apparatus, it is more efficient to give priority to communication performed in the same network.

However, the specific apparatus does not necessarily exist in the same network. Further, in a network using wireless communication, it sometimes takes some time to determine whether or not communication can be performed in the same network, and hence wireless communication cannot always be quickly started in the same network.

SUMMARY OF THE INVENTION

The present invention provides a communication apparatus that is capable of performing communication by quickly determining a suitable communication path from among a plurality of communication paths, a method of controlling a communication apparatus, and a storage medium.

In a first aspect of the present invention, there is provided a communication apparatus comprising a search unit configured to perform search for a predetermined device from among other devices participating in the same network, a transmission unit configured to transmit content data to the predetermined device found by the search, and a control unit configured to control the communication apparatus by one of a plurality of modes including a first control mode in which in a case where after starting the search by the search unit, a first time period elapses without the predetermined device being found, the search for the predetermined device is stopped, and a second control mode in which in a case where after starting the search by the search unit, a second time period elapses without the predetermined device being found, the search for the predetermined device is stopped, and the transmission unit is caused to transmit the content data to a device outside the network, wherein the second time period is shorter than the first time period.

In a second aspect of the present invention, there is provided a communication apparatus comprising a search unit configured to perform search for a predetermined device participating in the same network, a transmission unit configured to transmit content data to the predetermined device found by the search, and a control unit configured to control the communication apparatus by one of a plurality of modes including a first control mode in which in a case where after starting the search by the search unit, a first time period elapses without the predetermined device being found, the search for the predetermined device is stopped, and a second control mode in which in a case where after starting the search by the search unit, a second time period elapses without the predetermined device being found, the transmission unit is caused to start transmitting the content data to a device outside the network, wherein the second time period is shorter than the first time period, wherein even after causing the transmission unit to start transmitting the content data to the device outside the network in the second control mode, the search for the predetermined device by the search unit is continued, and wherein in a case where the predetermined device has been found as a result of continuing the search, the control unit causes the transmission unit to stop transmitting the content data to the device outside the network, and start transmitting the content data to the predetermined device.

In a third aspect of the present invention, there is provided a method of controlling a communication apparatus, comprising performing search for a predetermined device from among other devices participating in the same network, transmitting content data to the predetermined device found by the search, and controlling the communication apparatus by one of a plurality of modes including a first control mode in which in a case where after starting the search, a first time period elapses without the predetermined device being found, the search for the predetermined device is stopped, and a second control mode in which in a case where after starting the search, a second time period elapses without the predetermined device being found, the search for the predetermined device is stopped, and the content data is caused to be transmitted to a device outside the network, wherein the second time period is shorter than the first time period.

In a fourth aspect of the present invention, there is provided a method of controlling a communication apparatus, comprising performing search for a predetermined device participating in the same network, transmitting content data to the predetermined device found by the search, and controlling the communication apparatus by one of a plurality of modes including a first control mode in which in a case where after starting the search, a first time period elapses without the predetermined device being found, the search for the predetermined device is stopped, and a second control mode in which in a case where after starting the search, a second time period elapses without the predetermined device being found, the content data is caused to start to be transmitted to a device outside the network, wherein the second time period is shorter than the first time period, wherein even after the content data is caused to start to be transmitted to the device outside the network in the second control mode, the search for the predetermined device is continued, and wherein in a case where the predetermined device has been found as a result of continuing the search, transmitting the content data to the device outside the network is caused to be stopped, and transmitting the content data to the predetermined device is caused to be started.

According to the present invention, the communication apparatus is capable of performing communication by quickly determining a suitable communication path from among a plurality of communication paths.

Further features of the present invention will become apparent from the following description of exemplary embodiments (with reference to the attached drawings).

BRIEF DESCRIPTION OF THE DRAWINGS

FIG. 13C is a sequence diagram of the via-server transmission process performed in the direct transmission/via-server transmission process by the communication system in FIG. 1, when the PC has received connection inhibition information from the cloud server in response to a query made about permission of connection in a step in the direct transmission process in FIG. 13A.

DESCRIPTION OF THE EMBODIMENTS

The present invention will now be described in detail below with reference to the accompanying drawings showing embodiments thereof.

Figure 1:
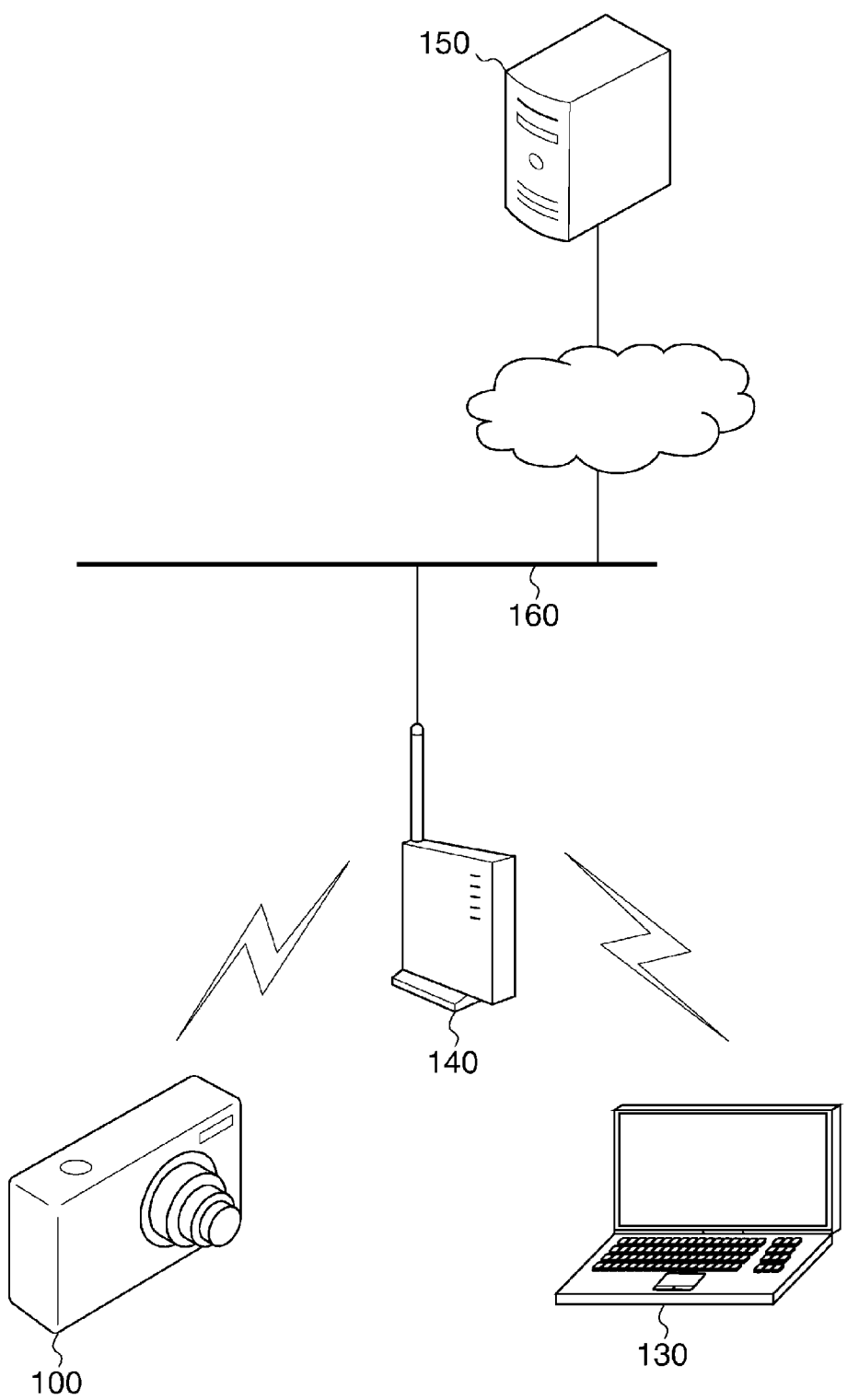
FIG. 1 is a schematic block diagram of a communication system including a communication apparatus according to an embodiment of the present invention.

FIG. 1 is a schematic block diagram of a communication system including a communication apparatus according to an embodiment of the present invention.

The communication system shown in FIG. 1 comprises a digital camera 100 which is an example of the communication apparatus according to the present embodiment, a personal computer (hereinafter referred to as the "PC") 130 which is an example of an information processing apparatus, an access point 140, and a cloud server 150. The access point 140 and the cloud server 150 are connected to each other via the Internet 160. Further, the digital camera 100 and the PC 130 are connected to the access point 140. The cloud server 150 can communicate with the digital camera 100 and the PC 130 which are connected to the access point 140, via the Internet 160.

The communication apparatus is not limited to the digital camera 100, but there may be also employed a mobile phone with a camera, a so-called tablet device, a PC, and so forth. Further, the information processing apparatus is not limited to the PC 130, but there may be also employed a digital camera, a mobile phone with a camera, a so-called tablet device, and so forth.

The digital camera 100 has the two functions of a direct transmission function for transmitting content, such as image data, directly to the PC 130 not via the cloud server 150, and a via-server transmission function for transmitting content via the cloud server 150. The direct transmission function is a function enabled when the digital camera 100 and the PC 130 are connected to the same network at the same time. On the other hand, the via-server transmission function is a function enabled when the digital camera 100 and the PC 130 cannot be connected to the same network at the same time, and the digital camera 100 can be connected to the Internet line 160.

In general, a transmission process using the direct transmission function (hereinafter referred to as "the direct transmission process") is higher in communication speed than a transmission process using the via-server transmission function (hereinafter referred to as "the via-server transmission process"). Therefore, even when execution of the via-server transmission process is instructed, the digital camera 100 of the present embodiment checks whether or not the direct transmission process can be performed first, and gives priority to execution of the direct transmission process to thereby make it possible to achieve efficient connection.

Figure 2:
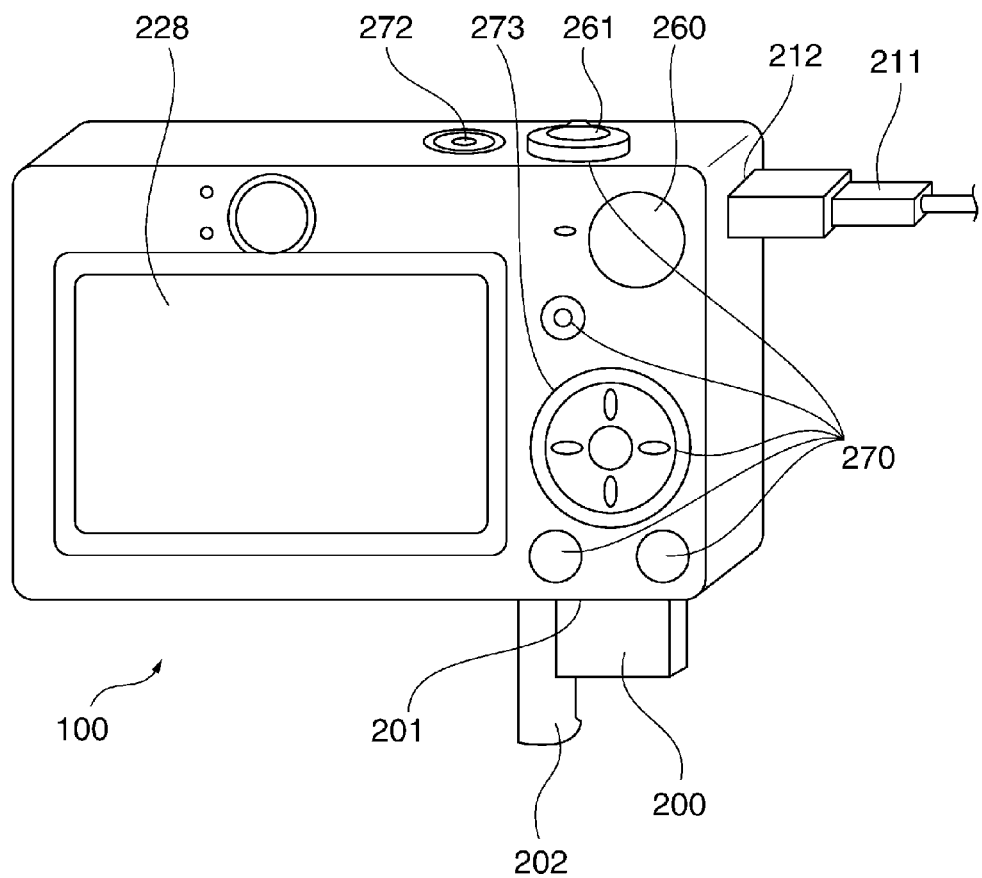
FIG. 2 is a diagram of the appearance of a digital camera, as the communication apparatus according to the embodiment, appearing in FIG. 1.

FIG. 2 is a diagram of the appearance of the digital camera 100 appearing in FIG. 1.

The digital camera 100 shown in FIG. 2 includes an image display section 228, a mode changeover switch 260, a shutter button 261, an operation section 270, a power switch 272, a connector 212, a recording medium slot 201, and a lid 202 of the recording medium slot.

The mode changeover switch 260 switches between various modes of the digital camera 100, such as a still image-recording mode, a moving image-recording mode, and a reproduction mode. The connector 212 connects a connection cable 211 and the digital camera 100, and the digital camera 100 connects to an external device via the connection cable 211. The recording medium slot 201 accommodates a recording medium 200 which is capable of communicating with the digital camera 100.

The operation section 270 includes a delete button, a menu button, a SET button, and a four-direction button 273 (an up button, a down button, a right button, and a left button in a cross arrangement), and receives various operations from a user. The user can perform the various operations also via a touch panel provided on a screen of the image display section 228 without operating the operation section 270.

Figure 3:
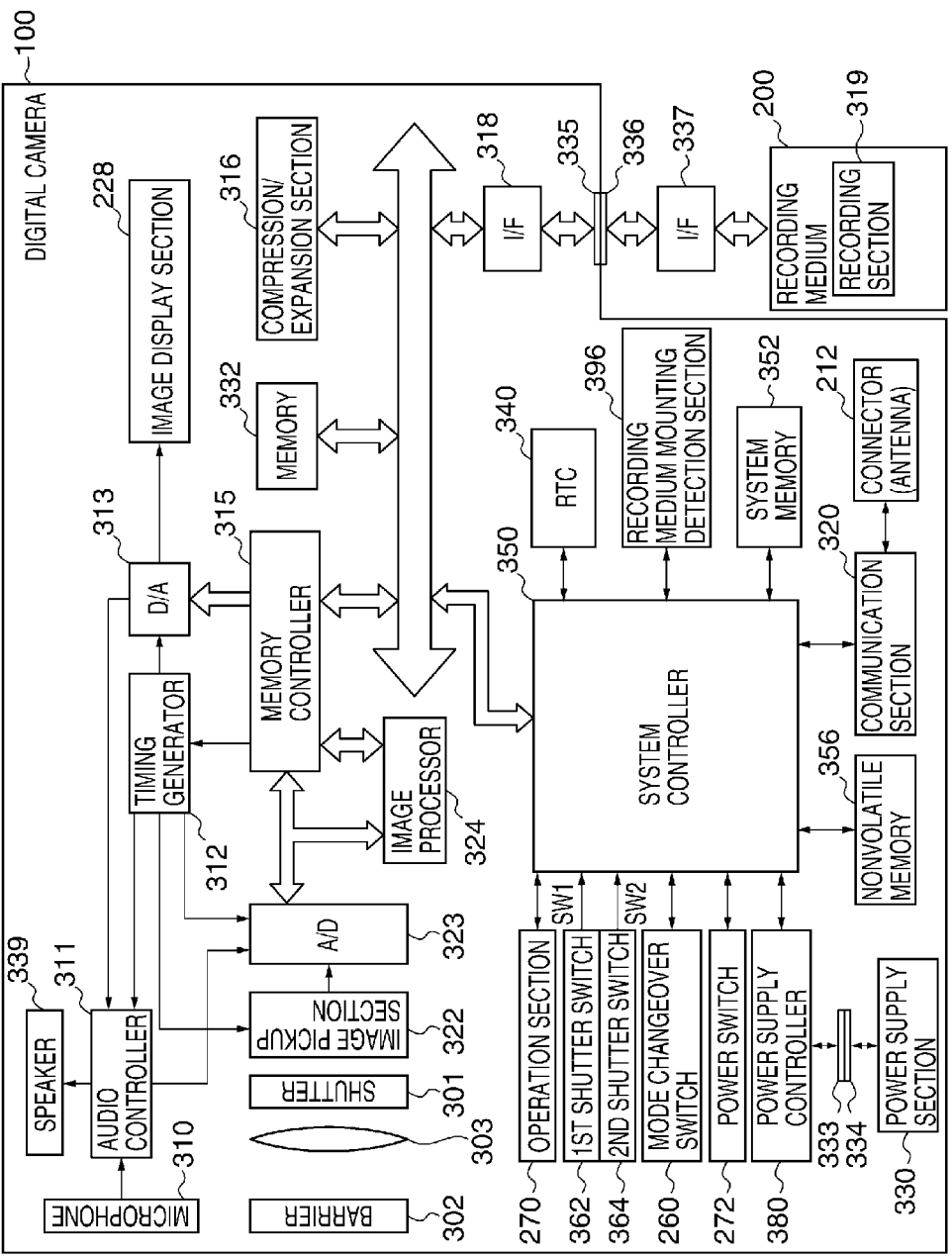
FIG. 3 is a block diagram of the internal configuration of the digital camera shown in FIG. 2.

FIG. 3 is a block diagram of the internal configuration of the digital camera 100 shown in FIG. 2.

An audio signal output from a microphone 310 is input to an analog-to-digital converter 323 via an audio controller 311 formed by an amplifier, etc., converted to a digital signal by the analog-to-digital converter 323, and then stored in a memory 332 via a memory controller 315.

The audio controller 311 stores audio data stored in the recording medium 200 into the memory 332, then converts the audio data to an analog signal by a digital-to-analog converter 313, and outputs the audio data as sound by driving a speaker 339. An image pickup section 322 is implemented e.g. by a CCD or CMOS device, which converts an optical image to an electric signal.

The analog-to-digital converter 323 is capable of converting an analog signal to a digital signal, and is used when an analog signal output from the image pickup section 322 is converted to a digital signal, and when an analog signal output from the audio controller 311 is converted to a digital signal. Data output from the analog-to-digital converter 323 is stored in the memory 332 via an image processor 324 and the memory controller 315 in this sequence, or via the memory controller 315 alone.

A timing generator 312 supplies a clock signal and a control signal to the audio controller 311, the digital-to-analog converter 313, the image pickup section 322, and the analog-to-digital converter 323, and is controlled by the memory controller 315 and a system controller 350. The digital-to-analog converter 313 converts data for image display, which is stored in the memory 332, to an analog signal, and supplies the resulting analog signal to the image display section 228.

A compression/expansion section 316 performs compression processing and expansion processing on image data of a photographed image and a compressed image which are stored in the memory 332, respectively, by executing adaptive discrete cosine transform (ADCT) or the like, and stores the processed image data in the memory 332. The image data stored in the memory 332 is filed by the system controller 350, and stored in the recording medium 200 via an interface 318.

The interface 318 provides an interface between the digital camera 100 and the recording medium 200, such as a memory card and a hard disk. The digital camera 100 stores image data in the recording medium 200 according to the standard of DCF (Design Rule for Camera File system).

The image processor 324 performs resize processing, such as predetermined pixel interpolation and reduction, and color conversion processing, on data output from the analog-to-digital converter 323 or data output from the memory controller 315. Further, the image processor 324 performs predetermined calculation processing using image data obtained by image pickup, and the system controller 350 performs exposure control and ranging control based on the obtained calculation results. By performing the above-mentioned controls, AF (auto-focus) processing using a TTL (through the lens) system, AE (automatic exposure) processing, and EF (electronic flash pre-emission) processing are performed. Further, predetermined calculation processing is performed using picked-up image data, and AWB (auto white balance) processing using the TTL system is performed based on the obtained calculation result.

The image display section 228 performs display on a display device, such as an LCD, according to an analog signal output from the digital-to-analog converter 313. For example, image data for display, which is stored in the memory 332, is displayed on the image display section 228 via the digital-to-analog converter 313. The digital camera 100 is not necessarily required to be equipped with the image display section 228, but is only required to be capable of connecting to an internal or external display device, and have a display controlling function for controlling the display of the display device. A power supply section 330 is formed by a primary battery, such as an alkaline battery or a lithium battery, a secondary battery, such as a NiCd battery, a NiMH battery, and a Li battery, an AC adapter, or the like.

The memory 332 stores image data obtained by converting the analog signal output from the image pickup section 322 to a digital signal, image data to be displayed on the image display section 228, and so forth. Further, the memory 332 is also used for storing audio data recorded by the microphone 310, still images, moving images, and file headers generated when image files are formed. Further, the memory 332 has a sufficient capacity to temporarily store data to be displayed on the image display section 228 (video memory), and store a predetermined number of still images, and a predetermined time period of moving images and sound.

Connectors 333 and 334 connect the power supply section 330 and a power supply controller 380. A RTC (Real Time Clock) 340 counts the date and time. The RTC 340 has a power supply section provided therein separately from the power supply controller 380, and even when supply of electric power by the power supply section 330 is stopped, the RTC 340 continues to be in a time counting state. Further, the system controller 350 having acquired the date and time counted by the RTC 340 sets a system timer, and performs timer control.

Connectors 335 and 336 are connectors for connecting the recording medium 200 and the interface 318. A recording medium attachment/removal detection section 396 detects whether or not the recording medium 200 has been attached to the connectors 335 and 336.

A system memory 352 is a RAM into which are loaded constants and variables used for the operation of the system controller 350, and programs read from a nonvolatile memory 356. The nonvolatile memory 356 is a memory which is electrically erasable and recordable, and for example, an EEPROM is employed as the nonvolatile memory 356. The nonvolatile memory 356 stores constants used for the operation of the system controller 350, programs for executing various processes, described hereinafter, and so forth.

The system controller 350 controls the overall operation of the digital camera 100. The system controller 350 performs various processes of the present embodiment, described hereinafter, by executing the programs stored in the nonvolatile memory 356.

The mode changeover switch 260, a first shutter switch 362, a second shutter switch 364, and the operation section 270 form an operation unit for inputting various operation instructions to the system controller 350. The mode changeover switch 260 can change the operation mode of the system controller 350 to one of the still image-recording mode, the moving image-recording mode, the reproduction mode, and so forth.

The first shutter switch 362 generates a first shutter switch signal SW1 when the shutter button 261 provided on the digital camera 100 is brought into a state in which pressing thereof is stopped halfway (so-called half-pressed state). The second shutter switch 364 generates a second shutter switch signal SW2 when the shutter button 261 is brought into a state in which pressing thereof is completely performed (so-called fully-pressed state).

In response to detection of generation of the first shutter switch signal SW1, the system controller 350 starts the operations of AF processing, AE processing, AWB processing, EF processing, etc. Further, in response to detection of generation of the second shutter switch signal SW2, the system controller 350 starts a series of photographing operations from reading a signal output from the image pickup section 322 to storing image data in the recording medium 200.

The operation section 270 includes, in addition to the aforementioned menu button and so forth, various function buttons, such as a termination button, a backward button, an image forward button, a jump button, a narrow-down button, and an attribute changing button. When the system controller 350 detects an operation of each button as a component of the operation section 270, the system controller 350 executes a function corresponding to the operated button. For example, when the menu button is pressed, the system controller 350 displays on the image display section 228 a menu screen which enables various settings to be made. A user can make various settings using the four-direction button and the SET button.

The power switch 272 is a switch for performing power-on and power-off operations. The power supply controller 380 comprises a battery detection circuit, a DC-DC converter, a switch circuit for switching a block to which electric power is supplied, etc. The power supply controller 380 detects whether or not a battery has been mounted, a battery type, and remaining battery capacity, and controls the DC-DC converter based on the detection result and an instruction from the system controller 350 to thereby apply a required voltage to sections including the recording medium 200 for a required time period.

A barrier 302 covers the image pickup section 322 to thereby prevent stain and damage to an image pickup system including a lens 303, a shutter 301 having a diaphragm function, and the image pickup section 322.

A communication section 320 provides an interface for connecting to an external device. In the present embodiment, the communication section 320 provides an interface for communicating with an external device using a so-called wireless LAN according to the standard of IEEE 802.11. However, the communication system is not limited to the wireless LAN. As the communication system, for example, an infrared communication system, Bluetooth (registered trademark), or a wireless USB may be employed. The digital camera 100 of the present embodiment can transmit and receive data, such as generated image data, to and from an external device via wireless communication, through the control of the communication section 320 by the system controller 350.

The connector 212 includes an antenna for connecting the digital camera 100 to another device via the communication section 320. The recording medium 200 is a memory card, a hard disk, or the like, including a recording section 319 formed by a semiconductor memory or a magnetic disk, and connects to the digital camera 100 via the connectors 335 and 336, and an interface 337.

Figure 4:
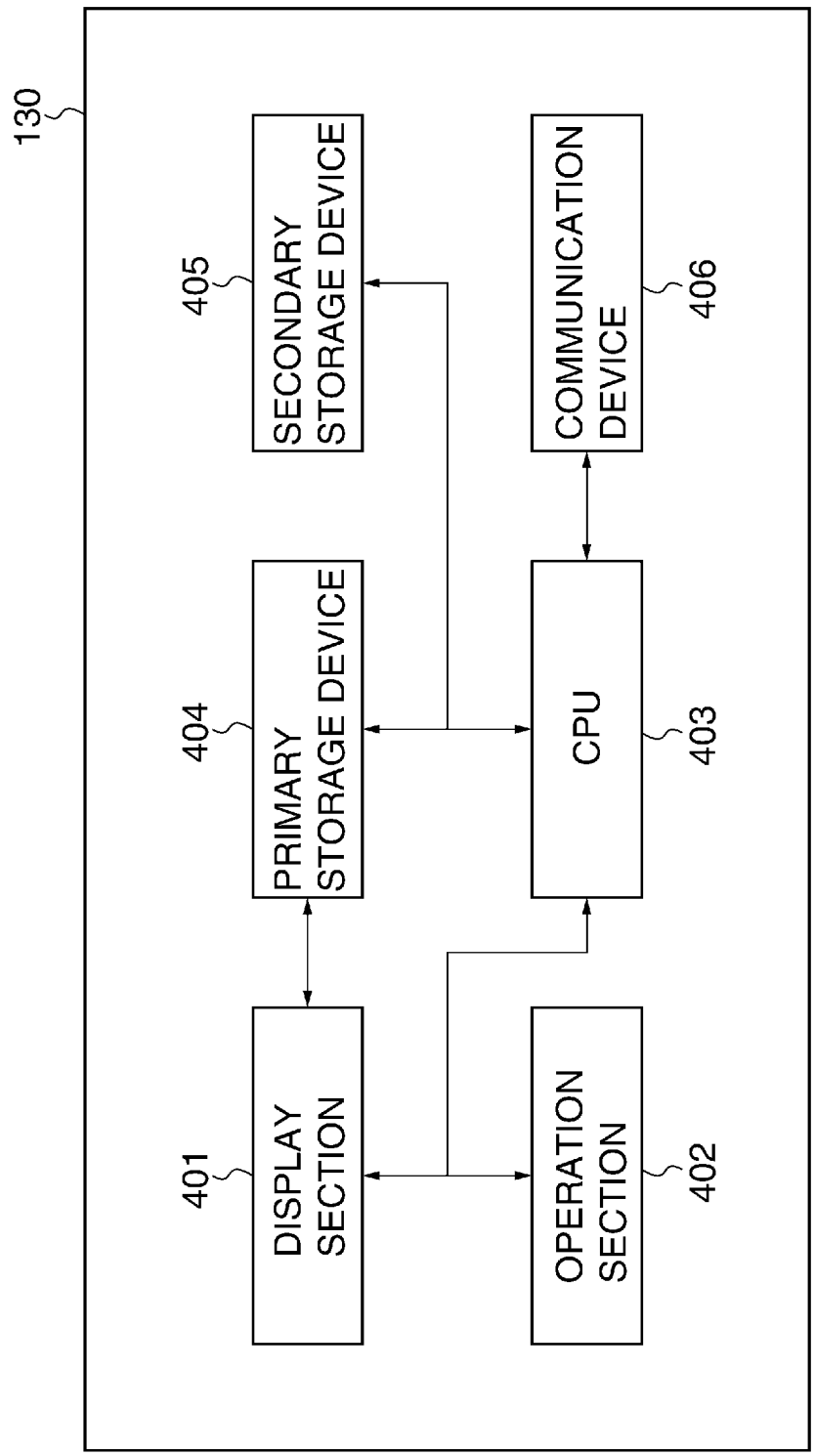
FIG. 4 is a block diagram of the internal configuration of a PC appearing in FIG. 1.

FIG. 4 is a block diagram of the internal configuration of the PC 130 appearing in FIG. 1.

The PC 130 shown in FIG. 4 includes a display section 401, an operation section 402, a CPU 403, a primary storage device 404, a secondary storage device 405, and a communication device 406.

The display section 401 is comprised of a display device, such as an LCD. The PC 130 is not necessarily required to have the display section 401, but is only required to have a display control function for controlling the display on the display section 401. The operation section 402 is comprised of a keyboard, a mouse, and a touch panel. The CPU 403 controls the overall operation of the PC 130.

The primary storage device 404 and the secondary storage device 405 are devices that read data from an external storage medium, and write data into an external storage medium. As the external storage medium, there can be employed, for example, a hard disk, an optical disk, such as a DVD-RW, a CD-ROM, a CD-R, and a DVD-RAM, a magnetic disk, such as a flexible disk and an MO, and a nonvolatile memory, such as a flash memory.

The communication device 406 is a device that performs communication with an external device, and the PC 130 is enabled to transmit and receive data to and from the external device, such as a digital camera and a mobile phone, via the communication device 406.

The cloud server 150 has the same configuration as that of the PC 130 except programs recorded therein and operations executed based on the programs.

Figure 5:
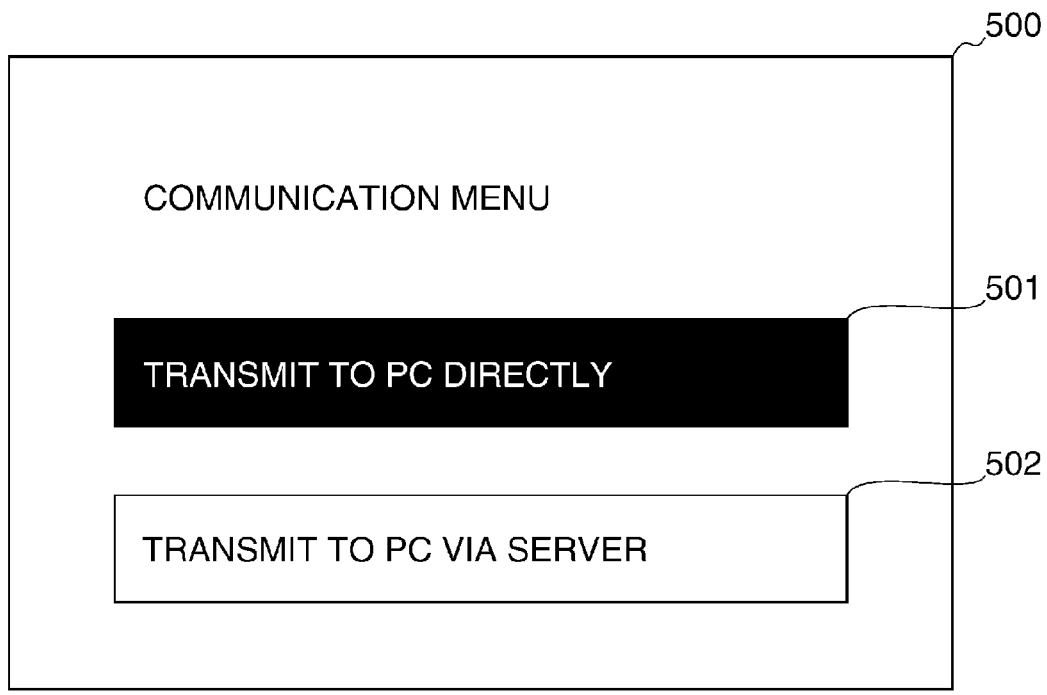
FIG. 5 is a diagram useful in explaining a communication menu screen displayed on an image display section appearing in FIG. 2.

FIG. 5 is a diagram useful in explaining a communication menu screen 500 displayed on the image display section 228 appearing in FIG. 2.

The communication menu screen 500 shown in FIG. 5 is displayed on the image display section 228 when the operation section 270 of the digital camera 100 is operated. The communication menu screen 500 displays a direct transmission function execution button 501 for executing the direct transmission function, and a via-server transmission function execution button 502 for executing the via-server transmission function.

In a case where pressing of the direct transmission function execution button 501 is detected, the system controller 350 appearing in FIG. 3 starts a direct transmission process described hereinafter with reference to FIG. 6. On the other hand, in a case where pressing of the via-server transmission function execution button 502 is detected, the system controller 350 starts a direct transmission process before the via-server transmission process, described hereinafter with reference to FIG. 13A. A user can select a desired image transmission method by pressing a selected one of these buttons 501 and 502.

The direct transmission process will be described.

Figure 6:
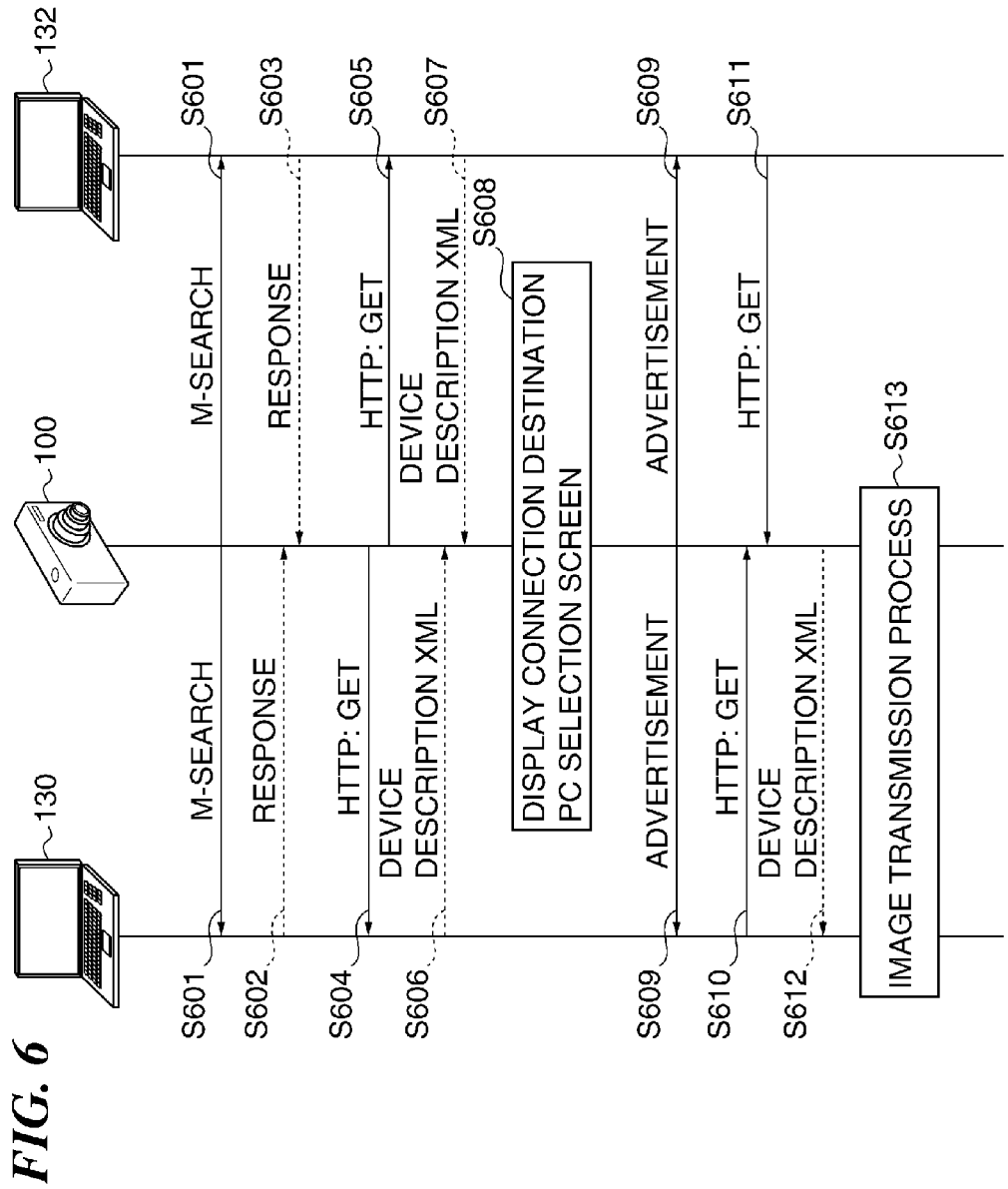
FIG. 6 is a sequence diagram of a direct transmission process performed by the communication system in FIG. 1.

FIG. 6 is a sequence diagram of the direct transmission process performed by the communication system shown in FIG. 1.

Referring to FIG. 6, the digital camera 100, and the PC 130 and a PC 132 in each of which an application for responding to the digital camera 100 has been installed and is being executed are connected to the same network. The digital camera 100, and the PCs 130 and 132 each support UPnP (Universal Plug and Play).

In the present embodiment, a step S601 is started in response to pressing of the direct transmission function execution button 501 appearing in FIG. 5.

Figure 7A:
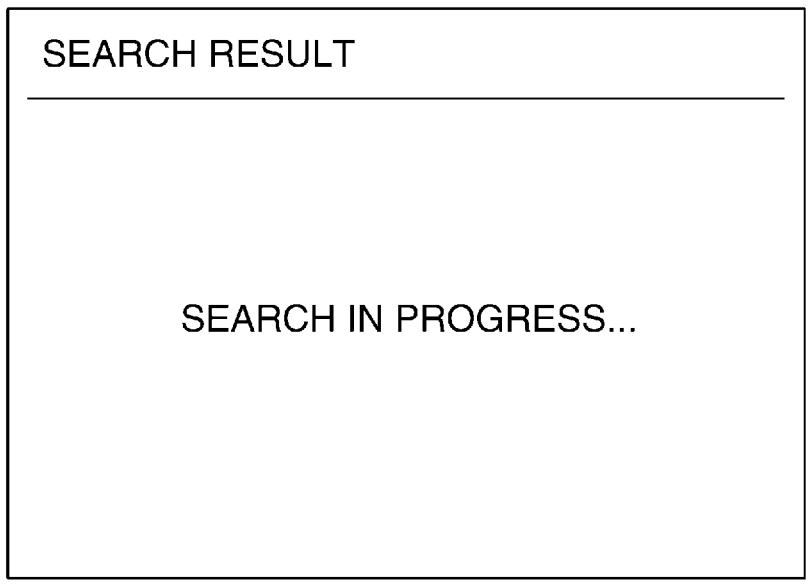
FIG. 7A is a diagram useful in explaining a search screen displayed in a step of the direct transmission process in FIG. 6.

In the step S601, the digital camera 100 searches for devices which are connected to the same network. During device search, to notify the user of this fact, a search screen indicating that device search is in progress is displayed on the image display section 228 of the digital camera 100. FIG. 7A shows an example of the search screen.

Further, in the step S601, the system controller 350 performs the device search for devices in the network according to SSDP (Simple Service Discovery Protocol) which is a UPnP protocol used when performing the search for other devices. A SSDP message is described in XML (Extensible Markup Language) format.

More specifically, first, the digital camera 100 sends an M-SEARCH (ssdp: discovery) message (M-SEARCH Request) defined by SSDP. The M-SEARCH message is simultaneously sent to all devices connected to the same network, i.e. both of the PCs 130 and 132 in the case of the illustrated example.

In steps S602 and S603, the PCs 130 and 132 having received the M-SEARCH message each send a response message (M-SEARCH Response) to the digital camera 100. The digital camera 100 can know existence of each of other devices connected to the same network by receiving the response message.

In steps S604 and S605, the digital camera 100 having recognized that the PCs 130 and 132 are connected to the same network sends a get command defined by HTTP (HTTP get command) to each of the PCs 130 and 132, so as to acquire device description of the PCs 130 and 132. The device description in the present embodiment is an XML file describing functions supported by the PC.

In steps S606 and S607, the PCs 130 and 132 each having received the HTTP get command send the device descriptions describing the names of the PCs 130 and 132 to the digital camera 100. The names of the PCs described in the device descriptions are e.g. "PC1" for the PC 130 and "PC2" for the PC 132.

It is a waste of power to continue waiting for a response for a long time in spite of the fact that the PCs 130 and 132 are not connected to the same network or that the PCs 130 and 132 have a difficulty in transmitting a response message and device description e.g. due to noise.

Therefore, in general, so-called timeout processing is executed in which a limit is provided for a time period (waiting time) to wait for the response, and if a predetermined time period elapses from a certain time point as a start time (e.g. a time at which a signal indicative of a response request is output), the processing is aborted. In the present embodiment, time before device description is received is counted by setting a time point at which the M-SEARCH message is sent as the start time. If a predetermined time period (e.g. 120 seconds) has elapsed from the start time, the direct transmission process is terminated.

Figure 7B:
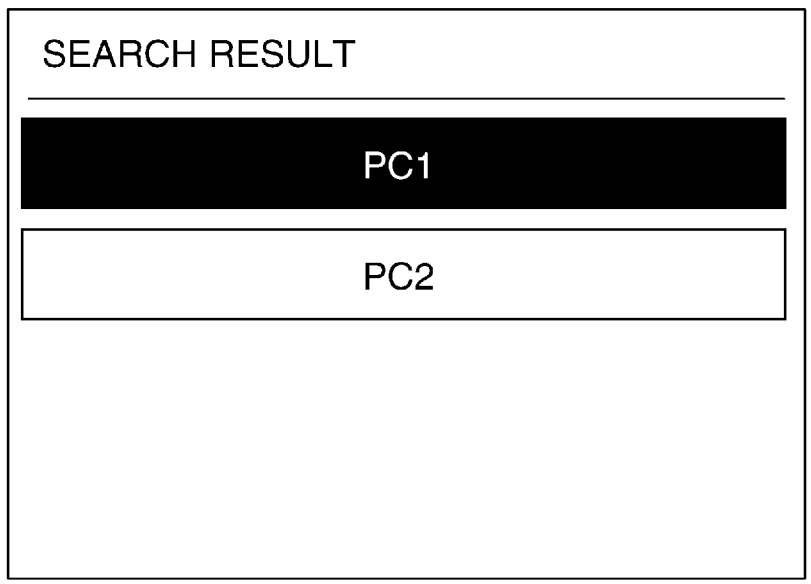
FIG. 7B is a diagram useful in explaining a connection destination PC selection screen displayed in other steps of the direct transmission process in FIG. 6.

The digital camera 100 having received the device description of the PCs 130 and 132 displays a connection destination PC selection screen on the image display section 228, on which candidates of a PC to be connected are listed, in a step S608. Here, for example, a screen shown in FIG. 7B is displayed. A name described in the device description is used for the display of a candidate of the connection destination. The user can designate a PC to be connected by selecting one of displayed candidates. In the example shown in FIG. 7B, the user selects "PC1" as the connection destination.

After the connection destination has been selected in the step S608, in a step S609, the system controller 350 executes processing called Advertisement. More specifically, the system controller 350 sends a NOTIFY (ssdp: alive) message to the PCs 130 and 132 which are all the devices connected to the same network, for notifying the PCs 130 and 132 that the digital camera 100 exists in the network.

In respective steps S610 and S611, the PCs 130 and 132 send an HTTP get command as a response to the NOTIFY message so as to acquire device information of the digital camera 100. A time period to wait for the response from each of the PCs 130 and 132 in this step is also limited by timeout processing executed by the digital camera 100. Here, the description is given taking as an example a case where the responses from the respective PCs have been received by the digital camera 100 within the time limit.

Upon receipt of the HTTP get commands from the PCs 130 and 132, respectively, the digital camera 100 sends, in a step S612, the device description as a response only to the PC 130 which is "PC1" selected in the step S608, and does not respond to the HTTP get command from the PC 132. This establishes connection between the digital camera 100 and the PC 130.

In a step S613, the digital camera 100 performs an image transmission process. More specifically, the digital camera 100 selects image data stored therein, and transmits the selected image data to the PC 130. Here, the image data to be transmitted may be selected according to a user's instruction, or image data satisfying the criteria of an object to be transmitted may be selected in advance.

Next, the direct transmission process by the digital camera 100 will be described with reference to FIGS. 8A and 8B.

Figure 8A:
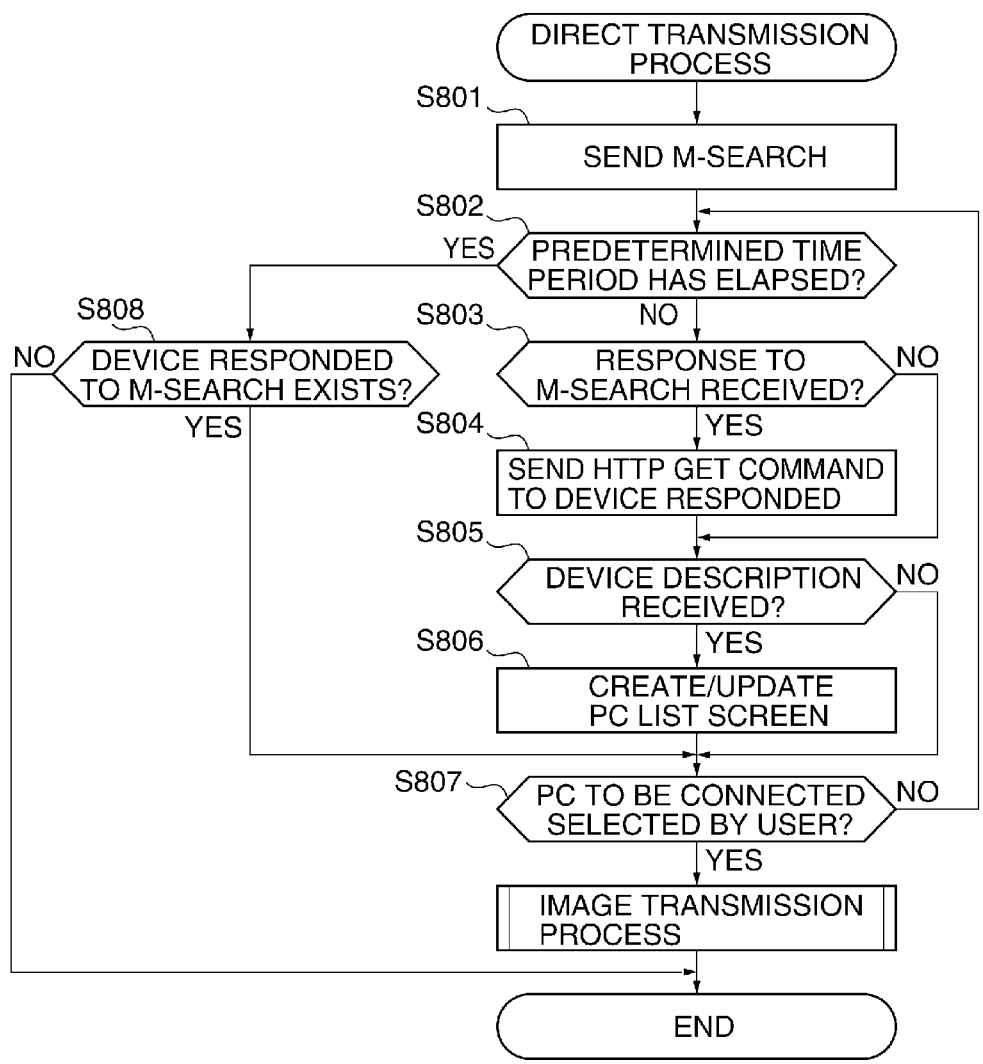
FIG. 8A is a flowchart of part of the direct transmission process in FIG. 6, which is executed by the digital camera.
Figure 8B:
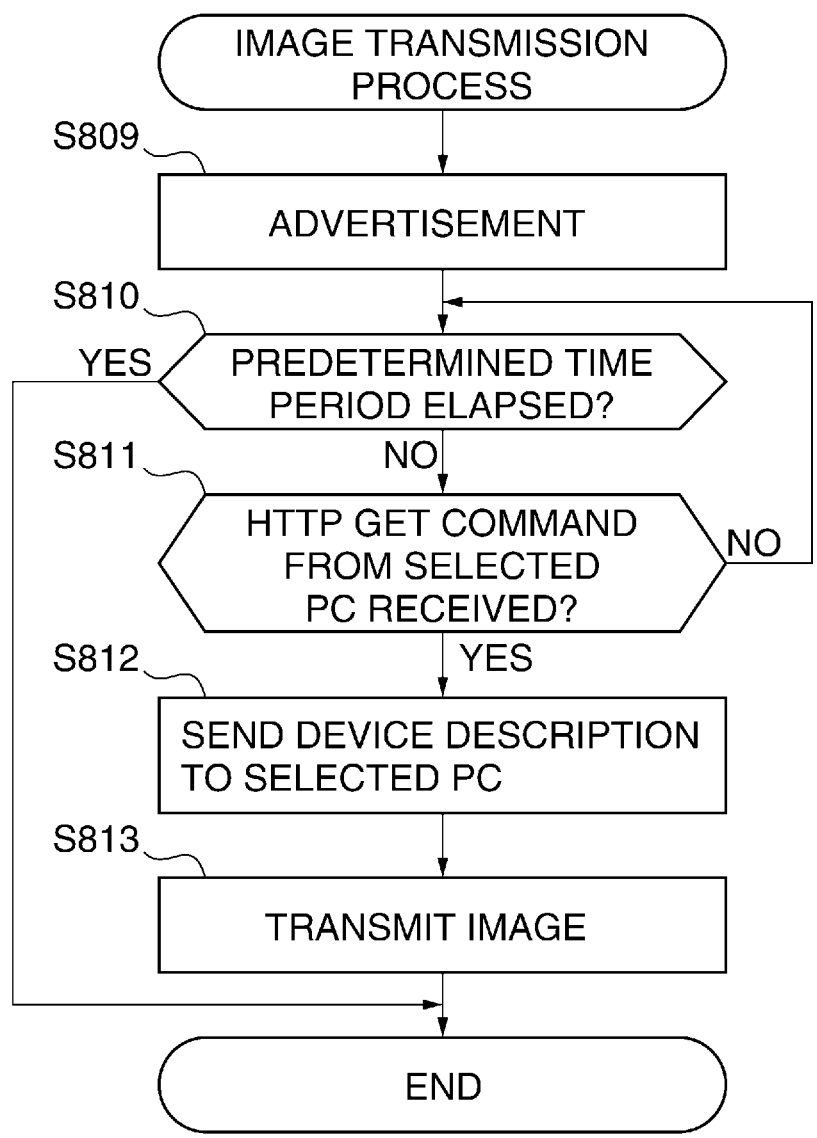
FIG. 8B is a flowchart of an image transmission process performed in a step of the direct transmission process in FIG. 8A.

FIG. 8A is a flowchart of part of the direct transmission process in FIG. 6, which is executed by the digital camera 100, and FIG. 8B is a flowchart of the image transmission process performed in a step of the direct transmission process in FIG. 8A.

The direct transmission process in FIG. 8A and the image transmission process in FIG. 8B are realized by controlling the sections of the digital camera 100 by the system controller 350 according to the programs stored in the nonvolatile memory 356. Further, the direct transmission process in FIG. 8A is started in response to pressing of the direct transmission function execution button 501 in FIG. 5.

First, in a step S801, the system controller 350 sends an M-SEARCH (ssdp: discovery) message to apparatuses (devices) connected to the same network. Headers of the M-SEARCH message include an MX (maximum time) header for specifying a timeout period in its field. A value specified in the MX header field indicates a time period to wait for a response to the M-SEARCH message. Here, the user starts the direct transmission process by pressing the direct transmission function execution button 501. That is, the user has an intention to directly transmit an image to the PC which is a transmission destination. Therefore, it is desirable to set in the MX header field a time period long enough to receive a response to the M-SEARCH message. In the present embodiment, the value specified in the MX header field is 120 seconds. The waiting time period of 120 seconds in this step is an example of a first time period.

Further, the time period described in this header field is used as a time period over which the digital camera 100 waits for a response, and is also used as a time period during which the PC is permitted to send a response (a response to be sent in the step S602 or S603 in FIG. 6). In a case where the time period specified in this header field has elapsed in a state in which transmission of a response is delayed e.g. due to a processing load on the PC, the PC does not send a response.

In the following step S802, the system controller 350 determines whether or not a predetermined time period has elapsed after transmitting the M-SEARCH message in the step S801.

If the system controller 350 determines that the predetermined time period has not elapsed, the process proceeds to a step S803.

In the step S803, the system controller 350 determines whether or not a response to the M-SEARCH message has been received. If the system controller 350 determines that a response has been received, the process proceeds to a step S804. In the step S804, the system controller 350 sends an HTTP get command to a device having returned the response. Then, the process proceeds to a step S805. On the other hand, if the system controller 350 determines in the step S803 that no response has been received, the process proceeds to the step S805 without executing the step S804.

In the step S805, the system controller 350 determines whether or not device description has been received which has been sent from the PC in response to the HTTP get command sent in the step S804. If the system controller 350 determines that the device description has been received, the process proceeds to a step S806. In the step S806, the system controller 350 creates or updates a screen of a connection destination device list based on the received device description.

On the device list screen created or updated in the step S806, the device names are sequentially displayed in the order of reception of device descriptions describing the respective device names in the step S805.

Then, in a step S807, the system controller 350 determines whether or not designation of the connection destination has been received via the operation section 270. If the system controller 350 determines in the step S807 that the connection destination has not been designated, the process returns to the step S802, and the steps S802 to S807 are repeated before the predetermined time period elapses. Note that if no device description has been received in the step S805, the name of a device searched for is not displayed in the step S806. In this case, the answer to the question of the step S807 is negative (NO), and the steps S802 to S807 are repeated. Whenever execution of the step S806 is repeated, the device list screen is updated.

On the other hand, if the system controller 350 determines in the step S807 that the connection destination has been designated, the system controller 350 performs the image transmission process (FIG. 8B).

The image transmission process in FIG. 8B is started when the system controller 350 determines in the step S807 that the connection destination has been designated.

Referring to FIG. 8B, in a step S809, the system controller 350 executes Advertisement processing for sending a NOTIFY (ssdp: alive) message to all devices in the same network.

Headers of the NOTIFY message include a CACHE-CONTROL header for specifying a timeout period in its field. A value specified in the CACHE-CONTROL header field indicates a time period to wait for a response to the NOTIFY message. That is, the CACHE-CONTROL header field corresponds to the MX header field of the M-SEARCH message. Therefore, in this header field as well, a time period is set which is long enough to receive a response to the NOTIFY message from a device. In the present embodiment, the value specified in the CACHE-CONTROL header field is 120 seconds. Further, similarly to the time period specified in the MX header field, the time period specified in this header field is used as a time period over which the digital camera 100 waits for a response, and is also used as a time period during which the PC 130 is permitted to send a response (HTTP get command sent in the step S610 in FIG. 6).

In a step S810, the system controller 350 determines whether or not a predetermined time period has elapsed after transmitting the NOTIFY (ssdp: alive) message in the step S809. The predetermined time period is the time period specified in the CACHE-CONTROL header field in the step S809 (120 seconds in this example). If the system controller 350 determines in the step S810 that the predetermined time period has elapsed, the present process is terminated, whereas if the system controller 350 determines in the step S810 that the predetermined time period has not elapsed, the process proceeds to a step S811.

In the step S811, the system controller 350 determines whether or not an HTTP get command has been received from a device designated as the connection destination in the step S807. This get command corresponds to the HTTP get command sent in the step S610 in FIG. 6.

If the system controller 350 determines in the step S811 that no HTTP get command has been received, the process returns to the step S810, and the system controller 350 waits for the HTTP get command. On the other hand, if the system controller 350 determines in the step S811 that the HTTP get command has been received, the process proceeds to a step S812.

In the step S812, the system controller 350 transmits the device description of the digital camera 100 to the PC designated as the connection destination in the step S807.

Then, in a step S813, the system controller 350 transmits an image. The steps S812 and S813 correspond to the steps S612 and S613 in FIG. 6.

Referring again to FIG. 8A, in the step S802 of the direct transmission process, if the system controller 350 determines that the predetermined time period has elapsed after transmitting the M-SEARCH message in the step S801, the process proceeds to a step S808.

In the step S808, the system controller 350 determines whether or not the device description has already been received. In other words, the system controller 350 determines whether or not there exists a device which has responded to the M-SEARCH message sent in the step S801. If it is determined that there exists a device which has responded to the M-SEARCH message, the process proceeds to the step S807, and the system controller 350 receives designation of the connection destination from the user.

Here, as the case where the predetermined time period has elapsed after transmitting the M-SEARCH message and also there exists a device having responded to the M-SEARCH message, it is possible to envisage a case where the user has a difficulty in deciding which device is to be connected. Particularly, such a case is likely to occur when the user has a large number of choices of the connection destination because a large number of PCs are connected to the same network. In this case, since the predetermined time period has already elapsed, it is regarded that responses from other devices no longer occur, and the responses, if any, are refused to be received. Accordingly, the device list screen is not updated. Therefore, the steps S802, S808, and S807 are sequentially repeated.

On the other hand, if the system controller 350 determines in the step S808 that no device having responded to the M-SEARCH message exists, the present process is terminated. Note that the process may be configured such that before terminating the present process, the user is notified that no PC has been found, and is enabled to select whether to search for a PC again or abort the search. If the user selects to search for a PC again, the present process is executed from the step S801 again. If the user selects to abort the search, the display returns to the communication menu screen 500 shown in FIG. 5.

As described above, when directly transmitting an image from the digital camera 100 to the PC 130, the digital camera 100 waits for a time period long enough to receive a response from a PC so as to make it possible to positively connect to the PC 130.

Next, the via-server transmission process will be described.

First, before describing the via-server transmission process, a camera cooperation setting process for causing the digital camera 100 to cooperate with the cloud server 150 will be described.

Figure 9:
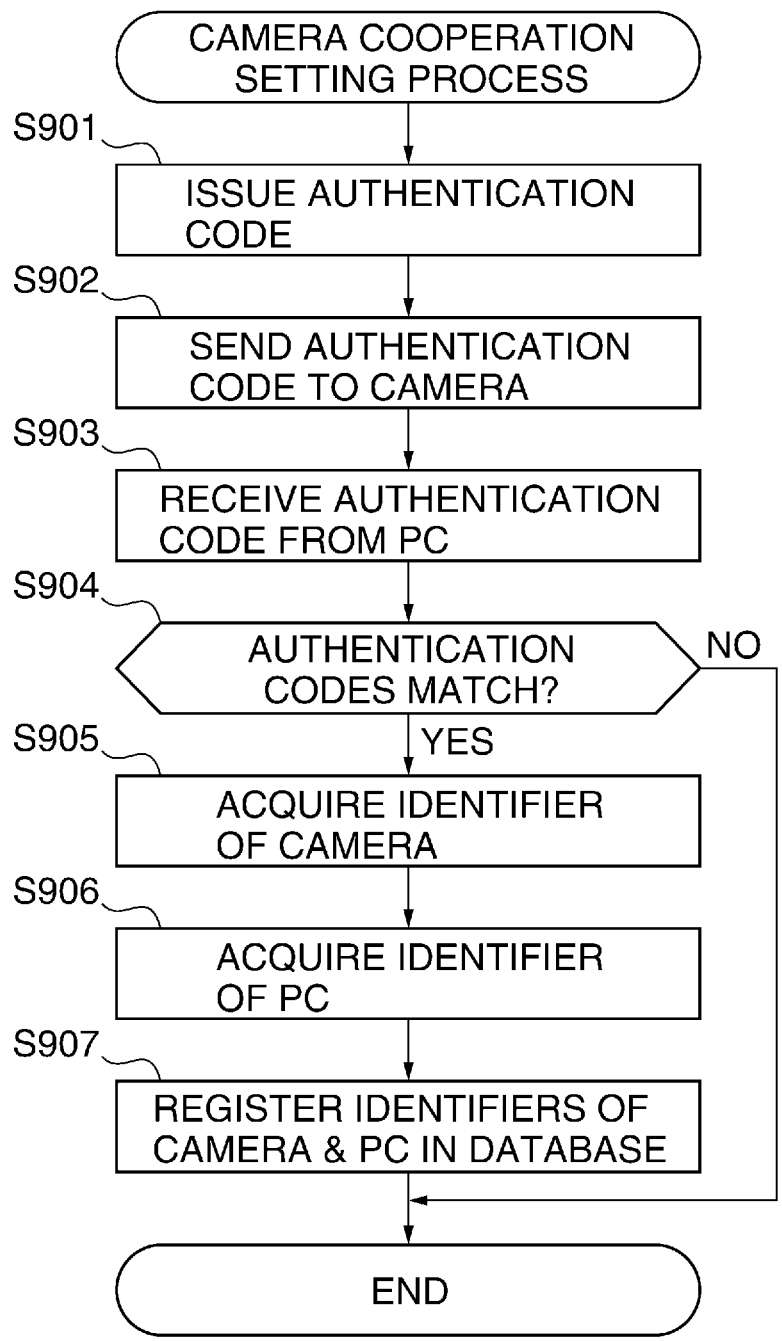
FIG. 9 is a flowchart of a camera cooperation setting process performed by a cloud server appearing in FIG. 1.

FIG. 9 is a flowchart of the camera cooperation setting process performed by the cloud server 150 appearing in FIG. 1.

The camera cooperation setting process in FIG. 9 is started in response to receipt of a request for issuing an authentication code from the digital camera 100 which is desired to cooperate with the cloud server 150.

Figure 10A:
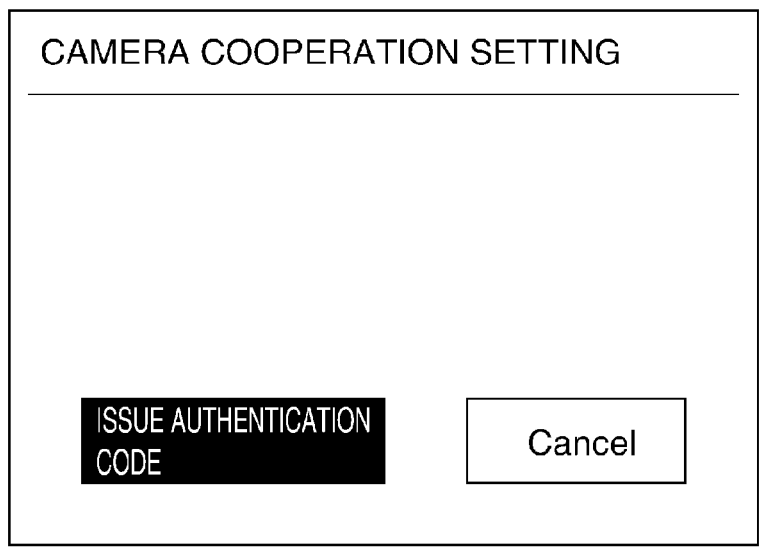
FIG. 10A is a diagram useful in explaining an authentication code issue request sent from the digital camera to the cloud server to cause the cloud server to start the camera cooperation setting process in FIG. 9.

The camera cooperation setting process in FIG. 9 is a process for preparing for a direct transmission/via-server transmission process (FIGS. 13A to 14), described hereinafter. The present process is started when the cloud server 150 receives a request for issuing an authentication code from the digital camera 100 which is desired to cooperate therewith. The authentication code issue request is sent from the digital camera 100 to the cloud server 150, when a screen shown in FIG. 10A is displayed e.g. on the image display section 228 of the digital camera 100 and the user presses a button of "issue authentication code" by operating the operation section 270.

In a step S901, the cloud server 150 issues an authentication code based on the authentication code issue request received from the digital camera 100. The authentication code to be issued is only required to be a unique one which enables identification of the digital camera 100. For example, a sequence of characters, a sequence of numbers, or a combination of these may be used.

Figure 10B:
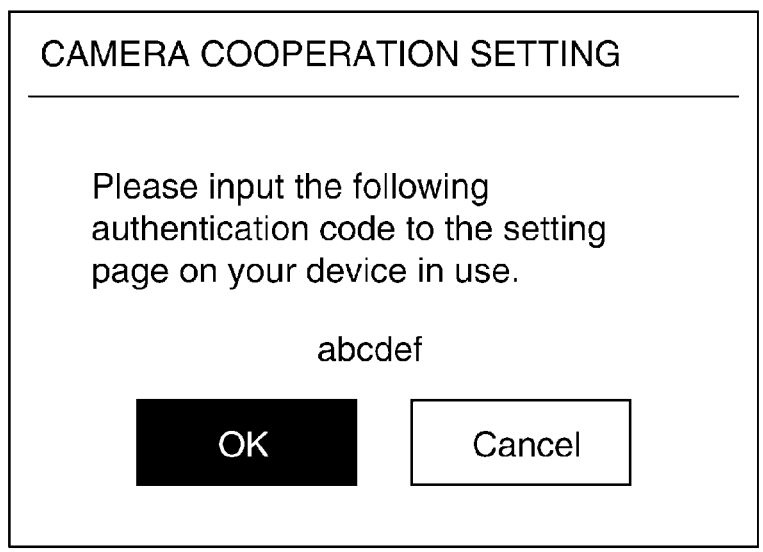
FIG. 10B is a diagram useful in explaining an authentication code issued in a step of the camera cooperation setting process in FIG. 9.

In a step S902, the cloud server 150 sends the issued authentication code to the digital camera 100. The digital camera 100 displays the received authentication code on the image display section 228 (FIG. 10B). The digital camera 100 controls the image display section 228 to display the issued authentication code "abcdef", for example, and display a guide message for prompting the user to input the authentication code when setting a device to be used. Upon being prompted, the user inputs the authentication code to the PC 130 while the authentication code is being displayed on the image display section 228 of the digital camera 100, and the PC 130 sends the input authentication code to the cloud server 150. More specifically, the user starts a browser of the PC 130, and causes the PC 130 to display a screen, e.g. a screen shown in FIG. 11, for associating the PC 130 with a camera whose information is stored in the cloud server 150. On the screen shown in FIG. 11, the user is prompted to input the authentication code displayed on the image display section 228 of the digital camera 100. When the user of the digital camera 100, who is also the user of the PC 130, presses an OK button in a state in which the authentication code displayed on the screen shown in FIG. 10B has been entered in an authentication code input box shown in FIG. 11, the input authentication code is sent to the cloud server 150.

In a step S903, the cloud server 150 receives the authentication code from the PC 130. In a step S904, the cloud server 150 compares the authentication code issued in the step S901 with the authentication code received in the step S903, and if it is determined that the authentication codes match, the process proceeds to a step S905, whereas if not, the present process is immediately terminated.

In the step S905, the cloud server 150 acquires an identifier of the digital camera 100, and further, in a step S906, acquires an identifier of the PC 130. These identifiers are issued by the digital camera 100 and the PC 130, respectively, and are only required to be unique ones which enable identification of the digital camera 100 and the PC 130, respectively. For example, as each of these identifiers, there may be used a random number which is originally generated, or a sequence of characters or a sequence of numbers which is generated e.g. from a MAC address or a serial number of the device, or a combination of these.

In a step S907, the cloud server 150 registers the identifiers of the digital camera 100 and the PC 130, which have been acquired in the steps S905 and S906, in a database of the cloud server 150, in association with each other, followed by terminating the present process. Here, the above-mentioned database will be described using a conceptual diagram.

Figures 11, 12:
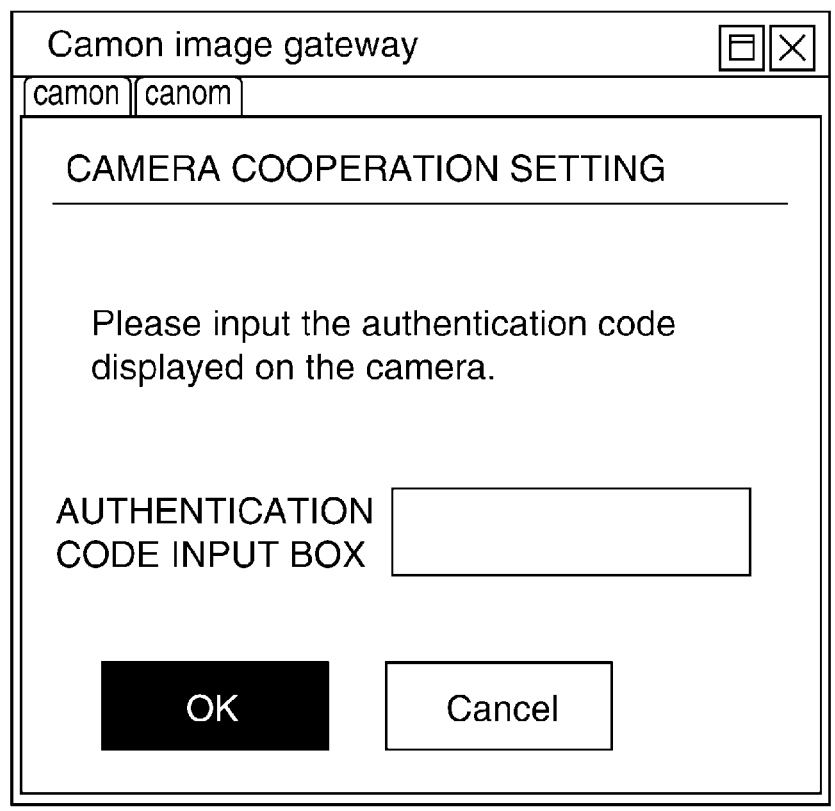
FIG. 11 is a diagram useful in explaining a camera cooperation setting screen displayed on a display section of the PC when transmitting an authentication code from the PC to the cloud server in a step of the camera cooperation setting process in FIG. 9.
FIG. 12 is a conceptual diagram useful in explaining an association of respective identifiers of the digital camera and the PC stored in a database of the cloud server in a step of the camera cooperation setting process in FIG. 9.

FIG. 12 is a conceptual diagram for explaining an association of respective identifiers of the digital camera 100 and the PC 130, which are stored in the database of the cloud server 150 in the step S907 of the camera cooperation setting process in FIG. 9.

In the conceptual diagram in FIG. 12, "123456" which is the identifier of the digital camera 100, and "3456789" which is the identifier of the PC 130 are associated with each other.

According to the present process, the digital camera 100 and the PC 130 are thus associated with each other in the cloud server 150, and preparation for executing the direct transmission/via-server transmission process is completed.

Next, the direct transmission/via-server transmission process performed by the communication system shown in FIG. 1 will be described with reference to FIG. 13A to FIG. 14.

Figure 13A:
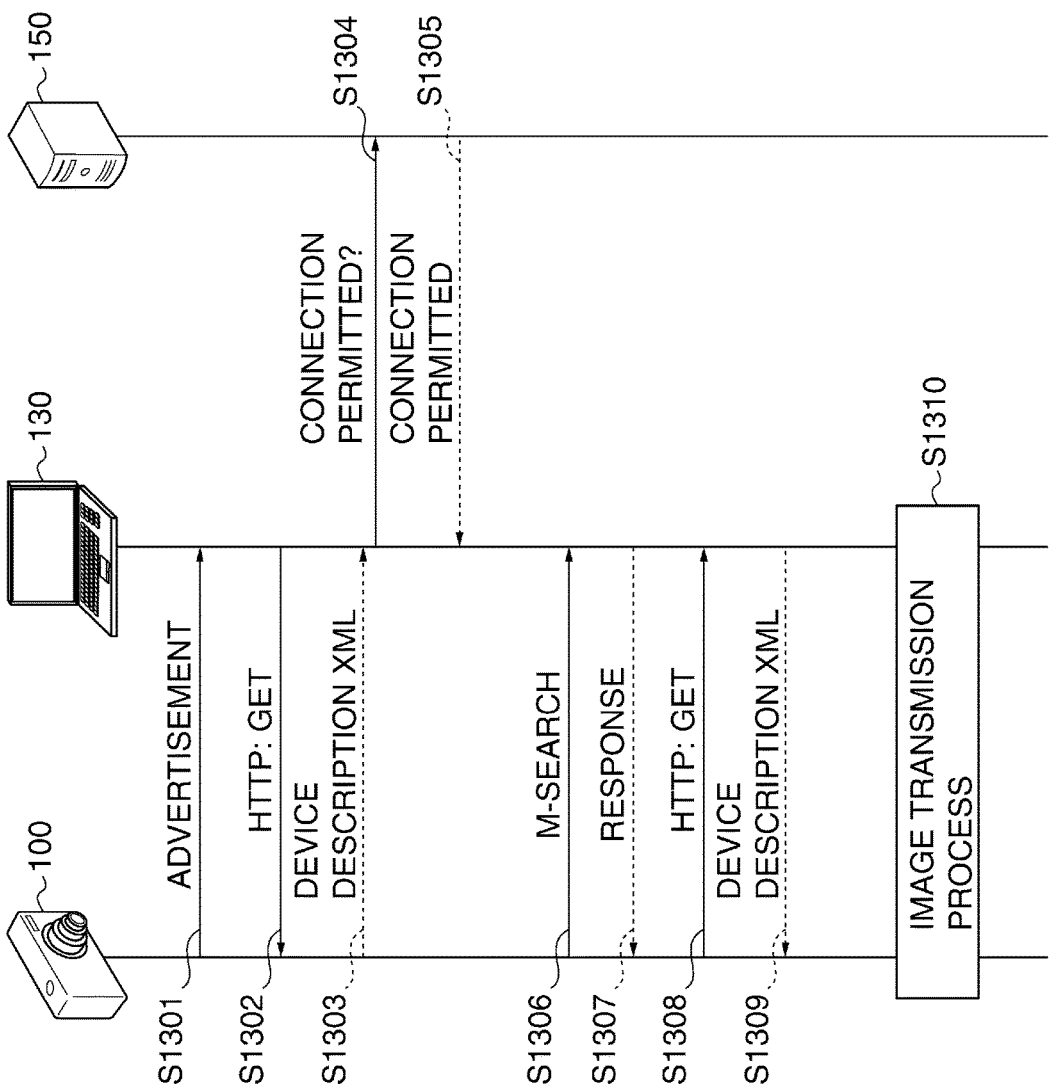
FIG. 13A is a sequence diagram of a direct transmission process performed in a direct transmission/via-server transmission process by the communication system in FIG. 1, before a via-server transmission process thereof.

FIG. 13A is a sequence diagram of the direct transmission process performed in the direct transmission/via-server transmission process by the communication system shown in FIG. 1, before the via-server transmission process thereof.

The direct transmission process in FIG. 13A is started when the via-server transmission function execution button 502 appearing in FIG. 5 is pressed.

Referring to FIG. 13A, in a step S1301, the digital camera 100 executes Advertisement processing for sending a NOTIFY (ssdp: alive) message to all devices connected to the same network.

In a step S1302, the PC 130 having received the NOTIFY message sends an HTTP get command to the digital camera 100 so as to acquire the device description of the digital camera 100.

In a step S1303, if the digital camera 100 receives an HTTP get command before a predetermined time period elapses after transmitting the NOTIFY message, the digital camera 100 sends the device description thereof to the PC 130 as an XML response. The device description includes the identifier of the digital camera 100, described in detail with reference to the step S905 in FIG. 9.

In a step S1304, the PC 130 having received the device description sends the identifier of the digital camera 100 and the identifier of the PC 130 to the cloud server 150, and sends a query to the same as to whether connection to the digital camera 100 is permitted.

The cloud server 150 having received the identifiers of the digital camera 100 and the PC 130 determines whether or not the received respective identifiers of the digital camera 100 and the PC 130 are associated with each other by consulting the database storing associated identifiers of which the association is described with reference to FIG. 12.

In a step S1305, if the received respective identifiers of the digital camera 100 and the PC 130 are associated, the cloud server 150 transmits information indicative of permission of connection to the digital camera 100 (connection permission information) to the PC 130.

A step S1306 is executed in parallel with the steps S1304 and S1305, and in this step, the digital camera 100 sends an M-SEARCH (ssdp: discovery) message to all devices connected to the same network.

When the PC 130 receives information indicative of inhibition of connection to the digital camera 100 (connection inhibition information) in the step S1305, the PC 130 sends no response to the M-SEARCH message received in the step S1306.

In a step S1307, the PC 130 having received the M-SEARCH message and the connection permission information from the cloud server 150 sends a response to the digital camera 100 before the predetermined time period elapses after transmission of the M-SEARCH message by the digital camera 100. In a step S1308, the digital camera 100 sends an HTTP get command to the PC 130.

In a step S1309, the PC 130 sends the device description to the digital camera 100 as an XML response. By receiving the device description, the system controller 350 can recognize existence of the PC 130 in the same network, as a final destination of transmission of the image. Note that there may be a plurality of PCs as the transmission destinations, and in this case, the connection destination PC selection screen shown in FIG. 7B may be displayed. Further, the connection destination PC selection screen may be updated whenever the device description is received until the predetermined time period elapses, similarly to the step S806 of the direct transmission process in FIG. 8A. When the predetermined time period has elapsed, update of the selection screen and the response from the connection destination PC are stopped.

In a step S1310, an image transmission process is performed by transmitting the image not to the cloud server 150, but directly to the PC 130.

Figure 13B:
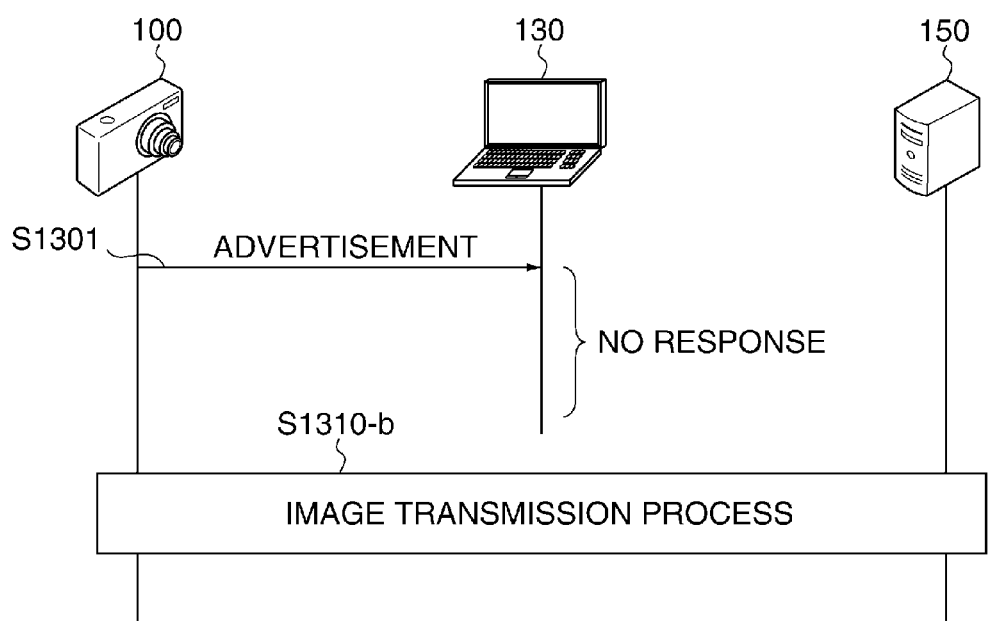
FIG. 13B is a sequence diagram of the via-server transmission process performed in the direct transmission/via-server transmission process by the communication system in FIG. 1, when a response has not been received within a predetermined time period in a step of the direct transmission process in FIG. 13A.

FIG. 13B is a sequence diagram of the via-server transmission process performed in the direct transmission/via-server transmission process by the communication system in FIG. 1, when a response has not been received within a predetermined time period in the step S1302 of the direct transmission process in FIG. 13A.

For example, in a case where the PC 130 is powered off, or the PC 130 does not exist in the same network, even when the predetermined time period elapses after transmitting the NOTIFY message from the digital camera 100, no response is received from the PC 130. Therefore, the digital camera 100 determines in the step S1302 that it is impossible to perform communication with the PC 130.

In this case, in a step S1310-b, the digital camera 100 connects to the cloud server 150 to perform the image transmission process by transmitting the image to the cloud server 150 without connecting to the PC 130.

FIG. 13C is a sequence diagram of the via-server transmission process performed in the direct transmission/via-server transmission process by the communication system in FIG. 1, when the PC 130 has received connection inhibition information from the cloud server 150 in response to a query made as to permission of connection in the step S1304 in the direct transmission process in FIG. 13A.

For example, in a case where the identifier of the PC 130 is not associated with the identifier of the digital camera 100, the cloud server 150 transmits the connection inhibition information to the PC 130 in a step S1305-c.

The PC 130 having received the connection inhibition information sends no response to the M-SEARCH message received from the digital camera 100 in the step S1306. As a consequence, the digital camera 100 confirms that no response has been received even when the predetermined time period has elapsed after transmitting the M-SEARCH message, and then connects to the cloud server 150 to perform the image transmission process. FIG. 13C shows an example of the case where the digital camera 100 cannot receive a response from the PC 130 to the M-SEARCH message sent from the digital camera 100 in the step S1306. As another example of the case where the digital camera 100 cannot receive a response from the PC 130 to the M-SEARCH message, it is possible to envisage, for example, a case where the PC 130 is powered off or goes out of the communication range of the same network, at any time between the steps S1303 and S1306. Also in this case, similarly to the above, the digital camera 100 cannot receive a response from the PC 130 to the M-SEARCH message sent from the digital camera 100 even when the predetermined time period has elapsed in the step S1306, and hence establishment of communication with the cloud server 150 is to be started in a step S1310-c.

Figure 14:
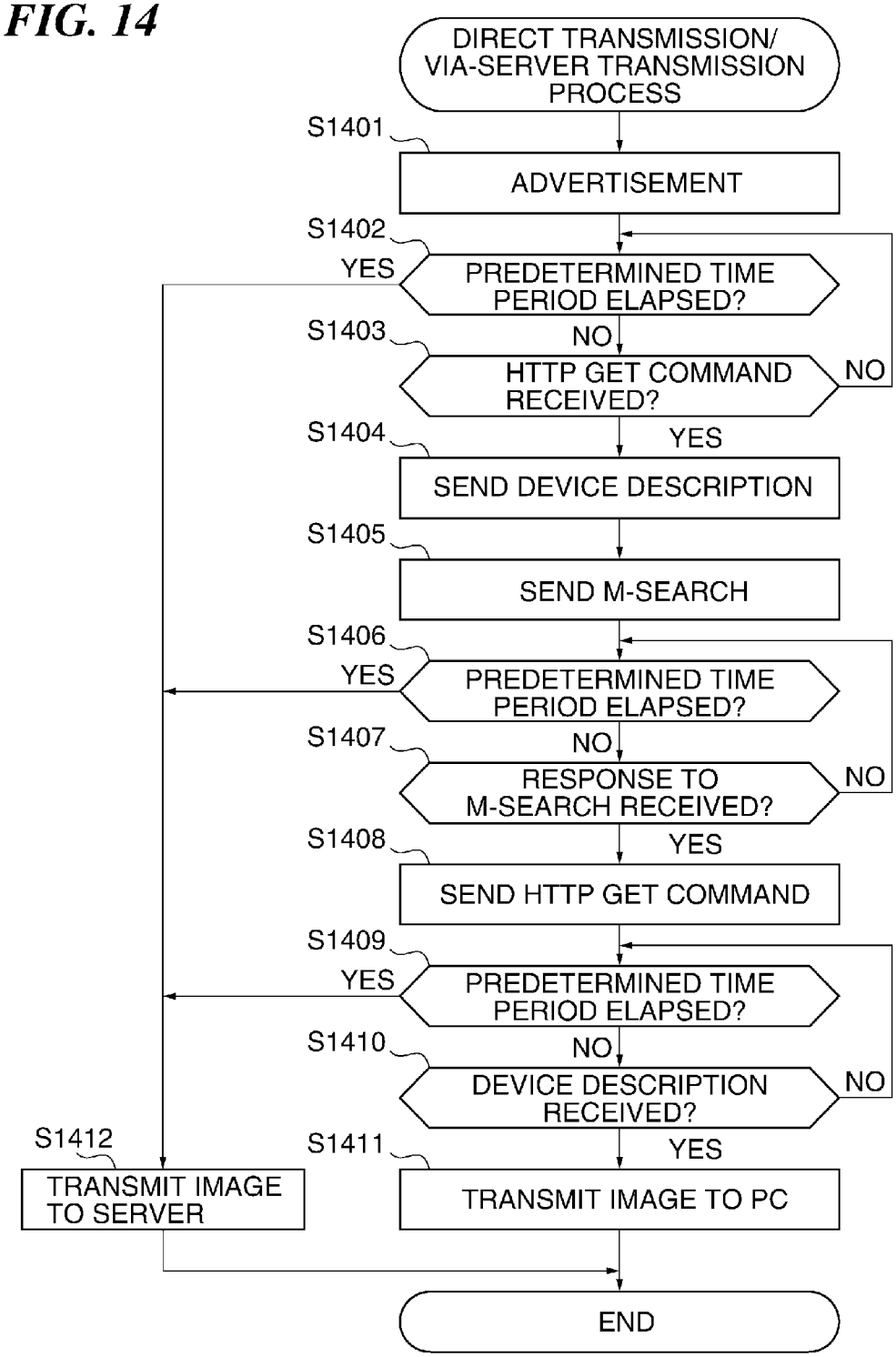
FIG. 14 is a flowchart of part of the direct transmission/via-server transmission process in FIGS. 13A to 13C, which is executed by the digital camera.

FIG. 14 is a flowchart of part of the direct transmission/via-server transmission process in FIGS. 13A to 13C, which is executed by the digital camera 100.

In a step S1401, the system controller 350 executes Advertisement (announcement) processing for sending a NOTIFY (ssdp: alive) message. In this step S1401, the predetermined time period specified in the CACHE-CONTROL header field of the NOTIFY message is not required to be as long as 120 seconds set in the step S809 of the direct transmission process in FIG. 8. This is because differently from the case where execution of the direct transmission process is instructed, in the case where execution of the via-server transmission process is instructed, it is presupposed that an image is to be transmitted to the server, and it is also considered that the situation where the PC does not exist in the same network occurs relatively more frequently. Therefore, in this case, smoothly starting the via-server transmission process by reducing a time period for PC search serves the user's purpose of positively connecting to the PC, rather than increasing the time period for PC search. To this end, when execution of the via-server transmission process is instructed, in the direct transmission process performed before the via-server transmission process, the time period to wait for a response from the PC is reduced, compared with the case where execution of the direct transmission process is instructed. For example, the predetermined time period specified in the CACHE-CONTROL header field of the NOTIFY message sent in this step is set to e.g. 10 seconds.

In a step S1402, the system controller 350 determines whether or not the predetermined time period has elapsed after transmitting the NOTIFY message. This predetermined time period is a time period specified in the CACHE-CONTROL header field in the step S1401, and is set to 10 seconds in the present embodiment. The waiting time period of 10 seconds in this step is an example of a second time period.

If the system controller 350 determines that the predetermined time period has elapsed, the process proceeds to a step S1412. It is envisaged that such determination in the step S1412 occurs in a case where a PC which is executing an application which realizes the via-server transmission function does not exist in the same network. In the step S1412, the system controller 350 connects to the cloud server 150, and executes the image transmission process for transmitting an image to the cloud server 150. That is, the system controller 350 determines, as a result of searching the network for approximately 10 seconds, that no PC to be connected exists, and shifts to communication with the cloud server 150.

On the other hand, if the system controller 350 determines in the step S1402 that the predetermined time period has not elapsed, the system controller 350 determines in a step S1403 whether or not an HTTP get command has been received from the PC 130.

If the system controller determines in the step S1403 that no HTTP get command has been received, the process returns to the step S1402, and the system controller 350 waits for an HTTP get command to be received until the predetermined time period elapses. On the other hand, if the system controller determines in the step S1403 that an HTTP get command has been received, the process proceeds to a step S1404.

In the step S1404, the system controller 350 sends the device description of the digital camera 100 to the PC 130.

In the following step S1405, the system controller 350 sends an M-SEARCH message to the PC 130.

The value of the predetermined time period specified in the MX header field of the M-SEARCH message is also set not to a relatively long time, such as 120 seconds, but to a relatively short time, such as 10 seconds, similarly to the predetermined time period specified in the CACHE-CONTROL header field of the NOTIFY message.

In a step S1406, the system controller 350 determines whether or not the predetermined time period has elapsed after transmitting the M-SEARCH message. This predetermined time period is the time period specified in the MX header field in the step S1405, and is set to 10 seconds in the present embodiment. If the system controller 350 determines that the predetermined time period has elapsed, the system controller 350 gives up communication with the PC, and the process proceeds to the step S1412, wherein the system controller 350 starts communication with the cloud server 150 (i.e. the via-server transmission process). On the other hand, if the system controller 350 determines that the predetermined time period has not elapsed, the process proceeds to a step S1407.

In the step S1407, the system controller 350 determines whether or not a response to the M-SEARCH message has been received from the PC 130. If the system controller 350 determines that no response has been received, the process returns to the step S1406, and the system controller 350 waits for a response until the predetermined time period elapses. On the other hand, if the system controller 350 determines that a response has been received, the process proceeds to a step S1408.

In the step S1408, the system controller 350 sends an HTTP get command to the PC 130 for requesting the device description of the PC 130.

In a step S1409, the system controller 350 determines whether or not the predetermined time period has elapsed after transmitting the HTTP get command. In this step, similarly to the steps S1403 and S1406, the predetermined time period is set to 10 seconds.

If the system controller 350 determines that the predetermined time period has elapsed, the process proceeds to the step S1412, whereas if not, the process proceeds to a step S1410.

In the step S1410, the system controller 350 determines whether or not the device description has been received from the PC 130. If the system controller 350 determines that the device description has not been received, the process returns to the step S1409, wherein the system controller 350 waits for the device description to be received until the predetermined time period elapses. On the other hand, if the system controller 350 determines that the device description has been received, the process proceeds to a step S1411. In this case, acquisition of all items of information required to perform communication with the PC is completed. Therefore, in the step S1411, the system controller 350 executes the image transmission process for transmitting an image not to the cloud server 150, but to the PC 130.

As described above, when execution of the via-server transmission function is instructed, the digital camera 100 according to the present embodiment sets the time period to wait for a response from the PC 130 in the direct transmission process before the via-server transmission process such that it is shorter than the time period to wait for a response from the PC 130 in the case where execution of the direct transmission function is instructed. This enables the digital camera 100 to transmit an image by changing the transmission process from the direct transmission process to the via-server transmission process in a short time period without unnecessarily waiting for connection to the PC. As a consequence, it is possible to reduce a time loss in image transmission, and quickly and efficiently transmit an image.

Figure 15:
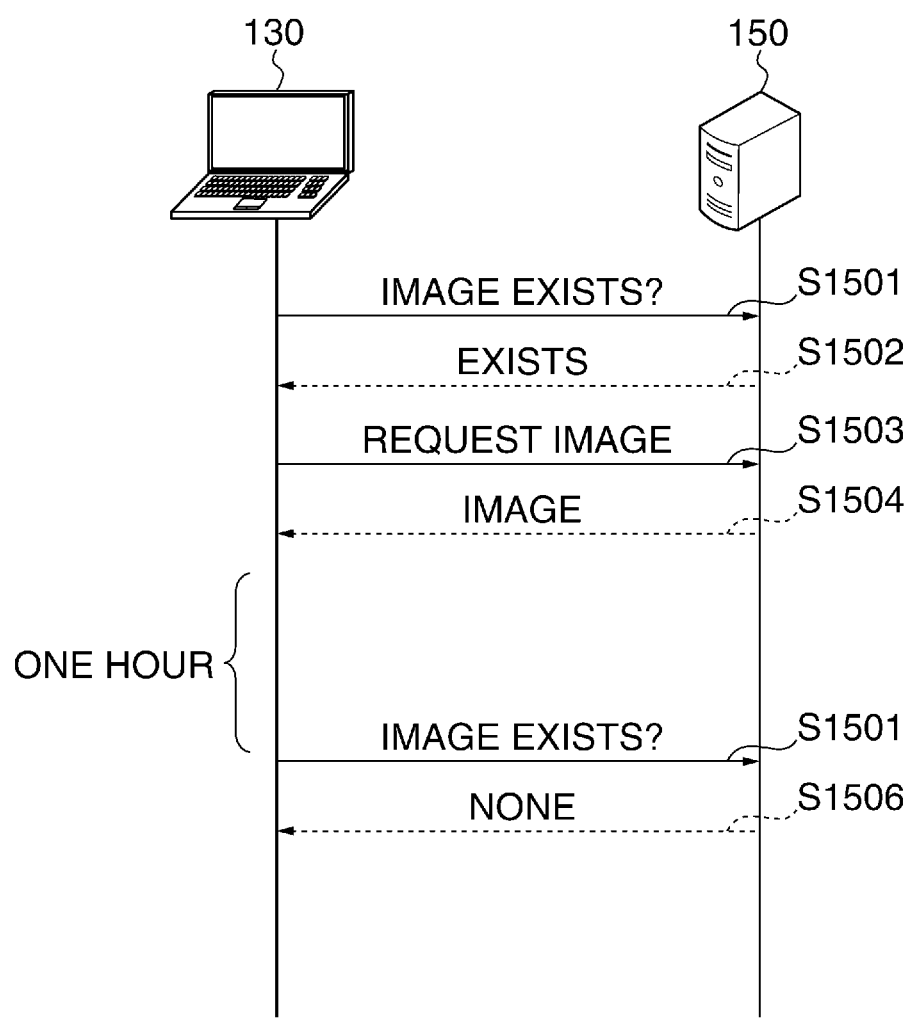
FIG. 15 is a sequence diagram of a process for downloading an image transmitted to the server in a step of the direct transmission/via-server transmission process in FIG. 14.

FIG. 15 is a sequence diagram of a process for downloading the image transmitted to the server in the step S1412 in FIG. 14.

The download process in FIG. 15 is started e.g. by executing an application for accessing the cloud server 150, which is installed in the PC 130.

In a step S1501, the PC 130 checks whether or not there is an image which has been transmitted from the digital camera 100 to the cloud server 150. If it is determined that there is an image which has been transmitted, the cloud server 150 notifies the PC 130 of existence of the image, in a step S1502. Further, in a step S1503, the PC 130 requests the cloud server 150 to transmit the image, and in a step S1504, the cloud server 150 transmits the image to the PC 130.

The steps S1501 to S1504 are periodically executed, e.g. whenever one hour elapses, whereby it is made possible to transmit an image picked up by the digital camera 100 to the PC 130 via the cloud server 150.

On the other hand, if it is determined in the step S1501 that no such an image exists, the cloud server 150 notifies the PC 130 of absence of the image, in a step S1506.

According to the download process in FIG. 15, it is possible to automatically back up image data to the PC 130 only by making use of the application, and hence it is possible to save the user time and effort of backing up the image data stored in the server, by himself/herself.

Although in the above-described embodiment, the description has been given of the example in which the time period to wait for a response to the HTTP get command sent in the step S1408 in FIG. 14 is reduced, the time period to wait for a response to the HTTP get command sent in the step S1408 in FIG. 14 is not necessarily required to be reduced, differently from the case of the time period set to wait for a response to the M-SEARCH message. That is, in the process in FIG. 14, the time period to wait for a response to the HTTP get command sent from the digital camera 100 may be set to be the same time period to wait for a response in the direct transmission process started in response to receipt of an instruction of execution of the direct transmission function.

The time period to wait for a response is set as above for the following reason: At a time point of transmission of the HTTP get command in the step S1408 in FIG. 14, the digital camera 100 has already confirmed existence of the PC 130. Therefore, in the communication in the step S1408 et seq., it is more efficient to give priority to positively establishing communication rather than reducing a time period to wait before it is determined that the communication is impossible.

Further, it is not necessary to reduce the time period to wait for a response to the M-SEARCH message sent in the step S1405 in FIG. 14, differently from the time period to wait for a response to the NOTIFY message sent by Advertisement processing in the step S1401 in FIG. 14. That is, in the direct transmission/via-server transmission process in FIG. 14, the time period to wait for a response to the NOTIFY message sent by the Advertisement from the digital camera 100 may be set to the same time period to wait for a response in the direct transmission process started in response to receipt of an instruction of execution of the direct transmission function.

The time period to wait for a response to the M-SEARCH message is set as above for the following reason: To send a response to the M-SEARCH message sent in the step S1405 in FIG. 14 from the PC 130, the PC 130 is required to send a query to the cloud server 150 as to permission of connection, based on the device description received in the step S1404. It is inefficient to abort the connection process before this query processing is completed. Therefore, in communication after these steps, it is more efficient to give priority to positively establishing communication rather than reducing a time period to wait before it is determined that the communication is impossible.

By doing so, even when it takes much time to connect from the digital camera 100 to the PC 130 e.g. due to a radio wave condition, the both can directly connect to each other, and it is possible to more efficiently determine a connection path.

Further, in the above-described embodiment, for the sake of simplicity, the description has been given taking, as an example, the case where if the digital camera 100 once determines that the PC 130 does not exist in the same network, and then starts uploading an image to the cloud server 150, the search for the PC 130 is not performed thereafter until the upload of the image is completed. However, even after the upload has been started, the search for the PC 130 may be continued in parallel. That is, the upload of the image to the cloud server 150 and Advertisement processing in the step S1401 in FIG. 14 may be performed in parallel. It is envisaged that such discovery of the PC 130 after starting the upload occurs in a case where the user powers on the PC 130 after the upload has been started. In this case, if a response to the Advertisement is received from the PC 130 during the upload, the step 1403 and the subsequent steps in FIG. 14 are executed to thereby establish connection to the PC 130, and processing for directly backing up the image in the PC 130 is started. In this case, the upload is aborted. However, at a time point of receipt of the response to the Advertisement, the upload is not aborted yet. This is because the PC 130 sends a query to the cloud server 150 as to whether or not connection to the digital camera 100 is permitted, based on the device description of the digital camera 100, and depending on the result of this query, the connection to the PC 130 may be rejected. Therefore, the upload is aborted at a time point when the digital camera 100 receives the device description of the PC 130 in the step S1410 in FIG. 14 because the digital camera 100 becomes capable of establishing communication with the PC 130 at this time point. In a case where the processing is thus changed to directly backing up the image in the PC 130 during execution of the upload, the image data to be backed up, uploading of which has not been completed yet, is backed up by processing for directly backing up the image in the PC 130. Note that image data which has been already uploaded in the cloud server 150 is downloaded into the PC 130 according to the download process in FIG. 15 after completion of the processing for directly backing up the image in the PC 130.

Further, as described above, parallel execution of the upload and Advertisement processing consumes more power. This problem is more serious for a mobile terminal which is operated by a battery, such as the digital camera 100, than the PC 130 to which electric power is generally supplied from a domestic power supply. In view of this, the configuration may be such that the digital camera 100 does not perform Advertisement processing in parallel with the upload, but processing for searching for the digital camera 100 may be combined with the download process executed by the PC 130 which is described with reference to FIG. 15. In this case, the digital camera 100 waits for a NOTIFY message sent by Advertisement processing from the PC 130 so as to be capable of responding thereto, while uploading image data. When the digital camera 100 receives the NOTIFY message sent by Advertisement processing from the PC 130 during the upload, the digital camera 100 sends a response. Note that, as this response, for example, the digital camera 100 may execute Advertisement processing as executed in the step S1301 in FIG. 13A. That is, the digital camera 100 may start processing in FIG. 13A in response to receipt of the NOTIFY message sent by Advertisement processing from the PC 130. When the PC 130 receives this response, after that, the step S1302 et seq. in FIG. 13A is executed, whereby the processing is shifted to the processing for directly backing up the image, i.e. the direct transmission process, which is performed between the digital camera 100 and the PC 130.

The configuration may be such that the above-described change can be also executed in parallel with the download of image data from the cloud server 150 to the PC 130. It is envisaged that such reception of a NOTIFY message of Advertisement processing, from the digital camera 100, after the start of the download, and such reception of a response to a NOTIFY message of Advertisement processing sent from the PC 130, from the digital camera 100, occur e.g. in a case where the PC 130 is powered on in advance and then the download from the cloud server 150 is started, whereafter an instruction for starting the via-server transmission process is received at the digital camera 100. In this case, similarly to the case of aborting the uploading of image data from the digital camera 100, the PC 130 aborts downloading of the image data.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-169797 filed Aug. 19, 2013, which is hereby incorporated by reference herein in its entirety.

What is claimed is:

1. A communication apparatus comprising:
a storage device; and
a processor configured to execute computer executable instructions recorded on the storage device, the computer executable instructions including instructions, that when executed by the processor, cause the communication apparatus to:
display a first menu corresponding to a first control mode in which an original search for a predetermined device from among other devices participating in the same network is performed and, in a case where after starting the original search for the predetermined device, a first time period elapses without the predetermined device being found, the original search for the predetermined device is stopped, and display a second menu corresponding to a second control mode in which the original search for a predetermined device from among other devices participating in the same network is performed, in a case where after starting the original search for the predetermined device, a second time period elapses without the predetermined device being found, the original search for the predetermined device is stopped, and a process for transmitting the content data to a device outside the network is performed;
receive an instruction for executing one mode of a plurality of modes including the first control mode and the second control mode corresponding to one menu of the first menu and the second menu selected by a user's operation; and
operate according to the selected one mode of the plurality of modes including the first control mode and the second control mode,
wherein the second time period is shorter than the first time period.

2. The communication apparatus according to claim 1, wherein in a case where the predetermined device is found, the communication apparatus is caused to execute processing for transmitting the content data to the predetermined device.

3. The communication apparatus according to claim 2, wherein in the processing for transmitting the content data to the predetermined device, the communication apparatus transmits a request for information on the predetermined device to the predetermined device, and receives a response to the request,
wherein in a case where a third time period elapses without the response being received after transmitting the request for information on the predetermined device, the processing for transmitting the content data to the predetermined device is stopped, and
wherein the third time period is longer than the second time period.

4. The communication apparatus according to claim 1, wherein the predetermined device has been registered in the device outside the network.

5. The communication apparatus according to claim 1, wherein the predetermined device has been registered in the communication apparatus.

6. The communication apparatus according to claim 1, wherein the predetermined device has been registered in both of the communication apparatus and the device outside the network.

7. The communication apparatus according to claim 1, wherein in a case where a fourth time period elapses after attempting to access the device outside the network, access to the device outside the network is aborted, and
wherein the fourth time period is longer than the second time period.

8. The communication apparatus according to claim 1, wherein the communication apparatus is a camera, and the content data is one or both of an image and a moving image.

9. The communication apparatus according to claim 1, wherein the computer executable instructions further include instructions, that when executed by the processor, cause the communication apparatus to receive selection of one mode of the plurality of modes including the first control mode and the second control mode by a user before starting the search,
wherein in the first control mode, in a case where the first time period elapses without the predetermined device being found after starting the search, the search for the predetermined device is stopped, and the communication apparatus shifts to a state for receiving selection of the one mode of the plurality of modes including the first control mode and the second control mode by the user.

10. The communication apparatus according to claim 9, wherein before shifting to the state for receiving selection of one mode of the plurality of modes including the first control mode and the second control mode by the user, the communication apparatus notifies the user that the predetermined device has not been found.

11. The communication apparatus according to claim 1, wherein in a case where in the second control mode, a request from the predetermined device is received during transmission of the content data to the device outside the network, transmission of the content data is stopped to the device outside the network, and transmission of content data to the predetermined device which has been found is started.

12. A communication apparatus comprising:
a storage device; and
a processor configured to execute computer executable instructions recorded on the storage device, the computer executable instructions including instructions, that when executed by the processor, cause the communication apparatus to:
display a first menu corresponding to a first control mode in which an original search for a predetermined device from among other devices participating in the same network is performed and, in a case where after starting the original search for the predetermined device, a first time period elapses without the predetermined device being found, the original search for the predetermined device is stopped, and display a second menu corresponding to a second control mode in which the original search for a predetermined device from among other devices participating in the same network is performed, in a case where after starting the original search for the predetermined device, a second time period elapses without the predetermined device being found, and a process for transmitting the content data to a device outside the network is performed;
receive an instruction for executing one mode of a plurality of modes including the first control mode and the second control mode corresponding to one menu of the first menu and the second menu selected by a user's operation; and
operate according to the selected one mode of the plurality of modes including the first control mode and second control mode,
wherein the second time period is shorter than the first time period,
wherein even after starting transmission of the content data to the device outside the network in the second control mode, the original search for the predetermined device is continued, and
wherein in a case where the predetermined device is found as a result of continuing the original search, transmission of the content data to the device outside the network is stopped and transmission of the content data to the predetermined device is started.

13. A method of controlling a communication apparatus, comprising:
displaying a first menu corresponding to a first control mode in which an original search for a predetermined device from among other devices participating in the same network is performed and, in a case where after starting the original search for the predetermined device, a first time period elapses without the predetermined device being found, the original search for the predetermined device is stopped, and displaying a second menu corresponding to a second control mode in which the original search for a predetermined device from among other devices participating in the same network is performed, in a case where after starting the original search for the predetermined device, a second time period elapses without the predetermined device being found, the original search for the predetermined device is stopped, and a process for transmitting the content data to a device outside the network is performed;
receiving an instruction for executing one mode of a plurality of modes including the first control mode and the second control mode corresponding to one menu of the first menu and the second menu selected by a user's operation; and
operating according to the selected one mode of the plurality of modes including the first control mode and the second control mode,
wherein the second time period is shorter than the first time period.

14. A method of controlling a communication apparatus, comprising:
displaying a first menu corresponding to a first control mode in which an original search for a predetermined device from among other devices participating in the same network is performed and, in a case where after starting the original search for the predetermined device, a first time period elapses without the predetermined device being found, the original search for the predetermined device is stopped, and display a second menu corresponding to a second control mode in which the original search for a predetermined device from among other devices participating in the same network is performed, in a case where after starting the original search for the predetermined device, a second time period elapses without the predetermined device being found, and a process for transmitting the content data to a device outside the network is performed;
receiving an instruction for executing one mode of a plurality of modes including the first control mode and the second control mode corresponding to one menu of the first menu and the second menu selected by a user's operation;
operating according to the selected one mode of the plurality of modes including the first control mode and the second control mode,
the second time period being shorter than the first time period,
continuing, even after starting transmission of the content data to the device outside the network in the second control mode, the original search for the predetermined device; and
stopping, in a case where the predetermined device is found as a result of continuing the original search, transmission of the content data to the device outside the network and starting transmission of the content data to the predetermined device.

15. A non-transitory computer-readable storage medium storing a computer-executable control program for causing a computer to execute a method of controlling a communication apparatus,
wherein the method comprises:
displaying a first menu corresponding to a first control mode in which an original search for a predetermined device from among other devices participating in the same network is performed and, in a case where after starting the original search for the predetermined device, a first time period elapses without the predetermined device being found, the original search for the predetermined device is stopped, and displaying a second menu corresponding to a second control mode in which the original search for a predetermined device from among other devices participating in the same network is performed, in a case where after starting the original search for the predetermined device, a second time period elapses without the predetermined device being found, the original search for the predetermined device is stopped, and a process for transmitting the content data to a device outside the network is performed;

receiving an instruction for executing one mode of a plurality of modes including the first control mode and the second control mode corresponding to one menu of the first menu and the second menu selected by a user's operation; and operating according to the selected one mode of the plurality of modes including the first control mode and the second control mode, wherein the second time period is shorter than the first time period.

16. A non-transitory computer-readable storage medium storing a computer-executable control program for causing a computer to execute a method of controlling a communication apparatus, wherein the method comprises:

displaying a first menu corresponding to a first control mode in which an original search for a predetermined device from among other devices participating in the same network is performed and, in a case where after starting the original search for the predetermined device, a first time period elapses without the predetermined device being found, the original search for the predetermined device is stopped, and display a second menu corresponding to a second control mode in which the original search for a predetermined device from among other devices participating in the same network is performed, in a case where after starting the original search for the predetermined device, a second time period elapses without the predetermined device being found, and a process for transmitting the content data to a device outside the network is performed;

receiving an instruction for executing one mode of a plurality of modes including the first control mode and the second control mode corresponding to one menu of the first menu and the second menu selected by a user's operation;

operating according to the selected one mode of the plurality of modes including the first control mode and the second control mode, the second time period being shorter than the first time period, continuing, even after starting transmission of the content data to the device outside the network in the second control mode, the original search for the predetermined device; and stopping, in a case where the predetermined device is found as a result of continuing the original search, transmission of the content data to the device outside the network and starting transmission of the content data to the predetermined device.

* * * * *